(12) United States Patent
Mori et al.

(10) Patent No.: US 6,864,968 B2
(45) Date of Patent: Mar. 8, 2005

(54) METHOD OF MEASURING WAVELENGTH DISPERSION AMOUNT AND OPTICAL TRANSMISSION SYSTEM

(75) Inventors: Shota Mori, Kawasaki (JP); Futoshi Izumi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 258 days.

(21) Appl. No.: 10/105,163

(22) Filed: Mar. 26, 2002

(65) Prior Publication Data

US 2003/0071985 A1 Apr. 17, 2003

(30) Foreign Application Priority Data

Oct. 16, 2001 (JP) ........................................ 2001-318421

(51) Int. Cl.[7] .............................................. G01N 21/00
(52) U.S. Cl. ..................................................... 356/73.1
(58) Field of Search ............. 356/73.1, 44; 385/12–14, 385/27–31; 250/227.11, 227.18; 398/9–38

(56) References Cited

U.S. PATENT DOCUMENTS

| | | | | | |
|---|---|---|---|---|---|
| 4,767,207 A | * | 8/1988 | Takiguchi | ................... | 356/73.1 |
| 4,799,790 A | * | 1/1989 | Tsukamoto et al. | ........ | 356/73.1 |
| 6,266,170 B1 | | 7/2001 | Fee | | |
| 6,342,945 B1 | * | 1/2002 | Allen et al. | ................ | 356/73.1 |

\* cited by examiner

*Primary Examiner*—Tu T. Nguyen
(74) *Attorney, Agent, or Firm*—Staas & Halsey LLP

(57) ABSTRACT

Measuring a wavelength dispersion amount of an optical transmission line without disconnecting the optical transmission line. A measuring signal is transmitted together with a main signal from a first node while the optical transmission line is in operation. The measuring signal is extracted and returned at an opposing node. A delay time required for the measuring signal to return is measured. A length of optical transmission line between the nodes is calculated from the measured delay time. A wavelength dispersion amount of the optical transmission line is calculated based on the calculated length.

27 Claims, 25 Drawing Sheets

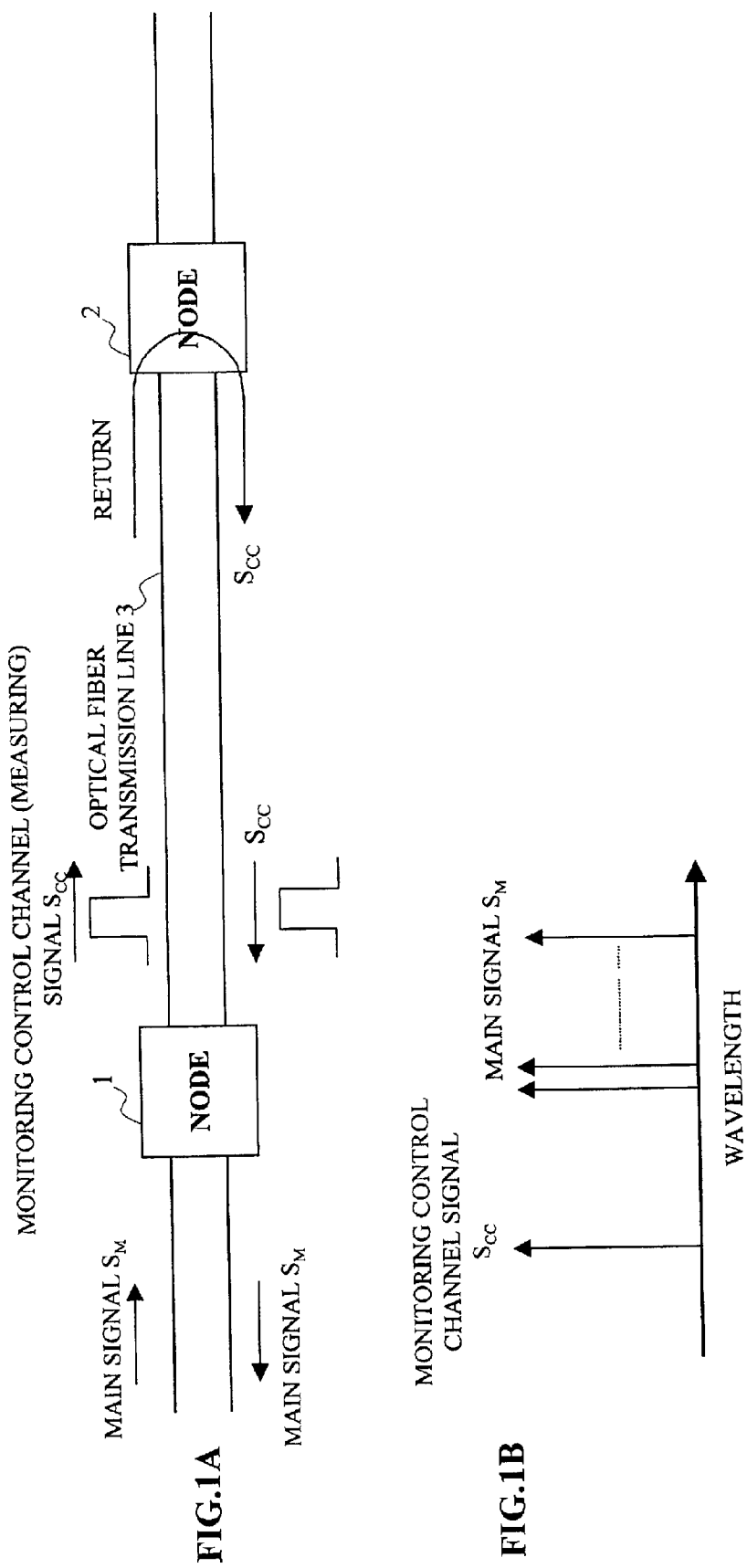

FLGS: TRANSMISSION FLAG
FLGR: RECEPTION FLAG

MEASUREMENT START COMMAND
FROM UPPER SYSTEM

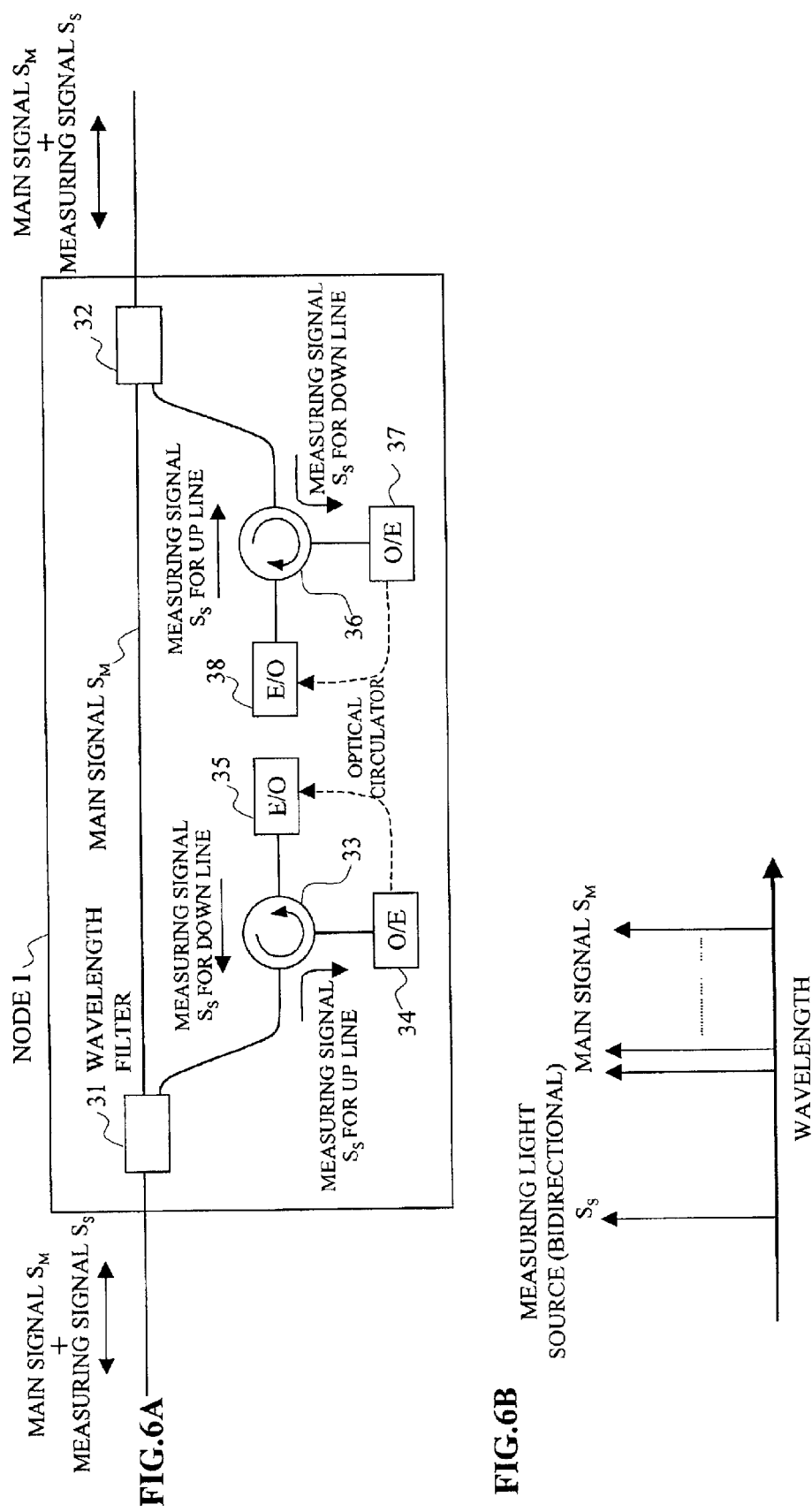

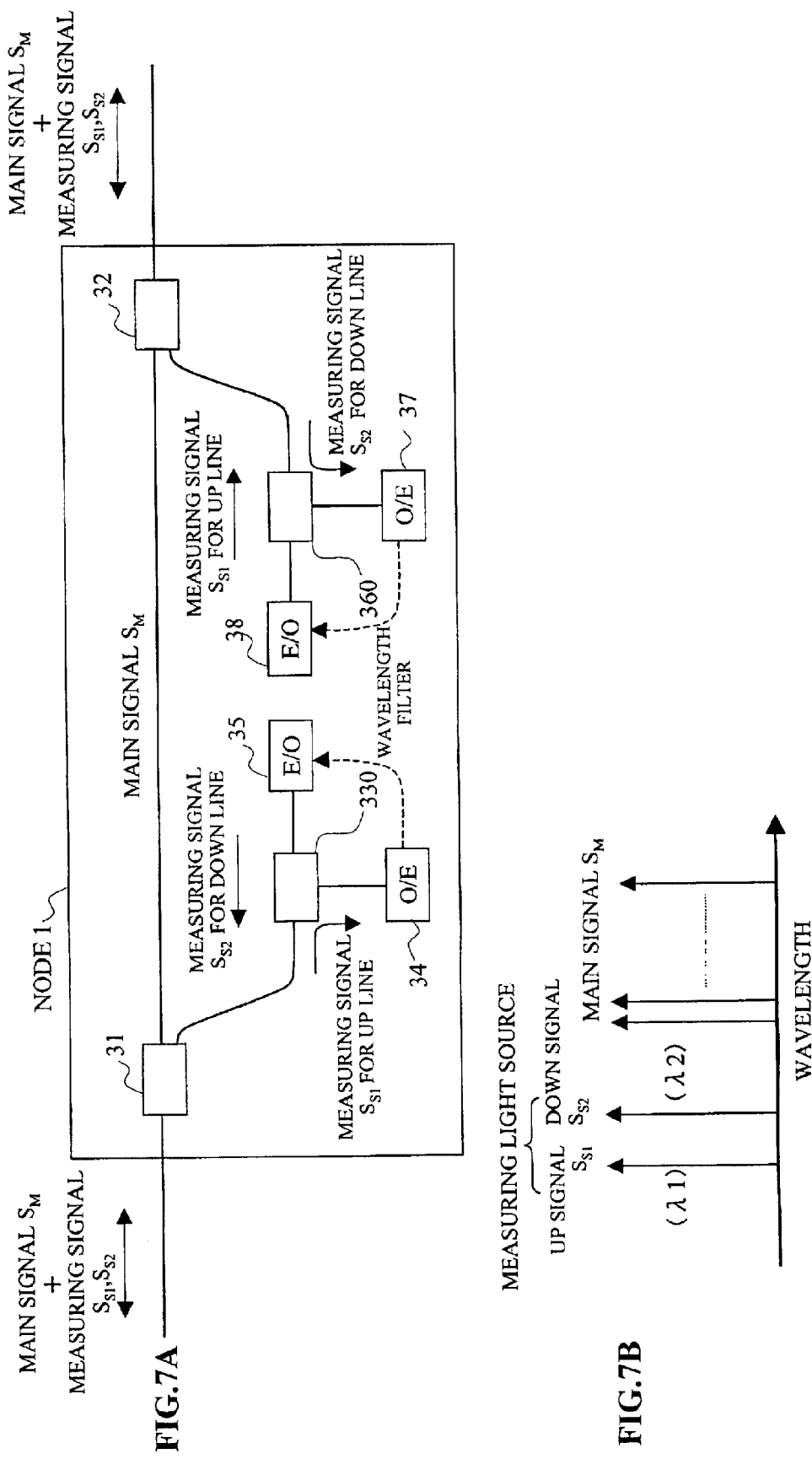

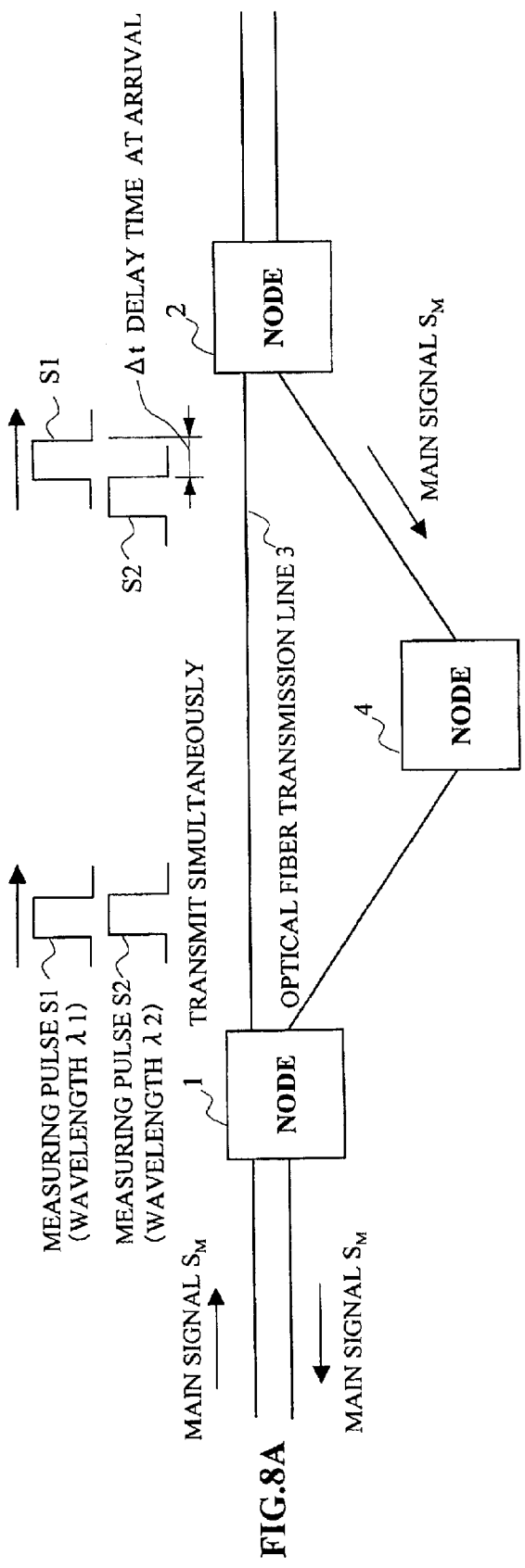

$\beta_i$: WAVELENGTH DISPERSION AMOUNT FOR EACH SPAN
OXC: OPTICAL CROSS-CONNECT NODE
TERM: OPTICAL TERMINATING NODE
ILA: RELAY AMPRIFIER NODE
OADM: OPTICAL ADD-DROP NODE $\beta_i$: WAVELENGTH DISPERSION AMOUNT FOR EACH SPAN
OXC: OPTICAL CROSS-CONNECT NODE
TERM: OPTICAL TERMINATING NODE
ILA: RELAY AMPLIFIER NODE
OADM: OPTICAL ADD-DROP NODE ature on the "METHOD OF MEASURING WAVELENGTH DISPERSION AMOUNT AND OPTICAL TRANSMISSION SYSTEM"

BACKGROUND OF THE INVENTION

1. Field of the Invention

The present invention relates to a method of measuring a wavelength dispersion amount and an optical transmission system, and in particular to a method of measuring a wavelength dispersion amount when wavelength-division multiplexing (WDM) signals are transmitted through optical transmission lines, and an optical transmission system using such a measuring method.

2. Description of the Related Art

Rapid growth of the Internet has been accompanied by corresponding rapid growth in demand for information transmission; a wavelength-division multiplexing (WDM) optical transmission system has been developed which combines from several tens to several hundreds of wavelengths into a single optical fiber for the transmission, and such a system is rapidly being deployed. At present, for the transmission rate per wavelength, 2.4 Gb/s is mainstream, which is hereafter expected to be replaced by a more rapid 10 Gb/s rate, and systems capable of 40 Gb/s are currently in development.

Several configurations for such a WDM optical transmission system are conceivable; the simplest of these is a point-to-point (P-P) system in which, as shown in FIG. 24A, "n" wavelengths are multiplexed at a transmission station (optical terminal node) TERM1, and attenuated optical signals are amplified by a relay amplifier node ILA while being transmitted, with the multiplexed state unchanged, to a reception station (optical terminal node) TERM2.

Optical transmission systems are also known in which, as in FIG. 24B, an optical add-drop (OADM) node is inserted between the transmission node TERM1 and the reception node TERM2, and a portion of the wavelengths in the wavelength-multiplexed optical signal are inserted or branched by an optical band-pass filter or other wavelength selection means. In this case, processing is performed at the optical level. Therefore, the systems are characterized in that functions of optical/electrical or electrical/optical conversion are not required.

FIG. 24C shows an arrangement of an optical cross-connect (OXC) (in this case, 2×2) in which switching functions per wavelength are realized through optical-level wave demultiplexing/multiplexing, and switching functions. Also in the case of this optical cross-connect, optical/electrical or electrical/optical conversion functions are not required.

Because, as described above, the number of WDM wavelengths has increased to several hundreds of channels, it becomes necessary to prepare transponders (devices to perform optical/electrical conversion, reproduce a signal, perform conversion of a modulation format and a wavelength, and connect to another device) for the number of wavelengths at the transmission and reception nodes, thereby increasing costs.

In consideration of this, a changeover to optical add-drop methods and optical cross-connect methods, which enable flexible switching of optical paths (routes) and which do not require optical/electrical or electrical/optical conversion, is anticipated. Development is currently underway to realize such an optical transmission system at low cost.

In the point-to-point system shown in FIG. 24A, which is currently mainstream of the WDM optical transmission system, if the transmission rate per wavelength increases as described above, a time slot per bit is shortened, and a wavelength bandwidth of a modulation signal spectrum is broadened. Therefore, waveform distortion (pulse broadening) due to wavelength dispersion gives rise to intersymbol interference, and this in turn is a factor limiting transmission lengths.

Consequently, technology at relay amplifier nodes for dispersion compensation of wavelength dispersion accumulated over an optical fiber transmission line has become important, and technology is employed which uses a dispersion compensation fiber (DCF) having a wavelength dispersion amount opposite to that of an optical fiber and performs adjustment such that the total wavelength dispersion amount is zero.

In order to design the wavelength dispersion amount of such a dispersion compensation fiber, it is necessary to know the wavelength dispersion amount in established optical transmission lines.

The most reliable method for obtaining such knowledge is to measure the actual wavelength dispersion characteristic. For example, methods which have been proposed are as follows: (1) a method of obtaining the characteristic by measuring the wavelength dependency of a transmission delay time of an optical pulse using a variable-wavelength light source, and by differentiating the wavelength dependency using the wavelength, as disclosed in Japanese Patent Application Laid-open No.8-334436, and (2) a method of obtaining the characteristic by measuring the component reflected by Rayleigh backscattering partway through an optical transmission line, using OTDR (Optical Time Domain Reflectometry), as disclosed in Japanese Patent Application Laid-open No.8-5515.

In cases where measurement of the actual wavelength dispersion is not possible, a method is adopted in which the transmission length is computed from a measured value of the loss in the established optical transmission line, and the wavelength dispersion amount of the established optical transmission line is estimated from catalog values of optical fiber parameters or measured values for optical fibers with similar characteristics.

In this way, by either measuring in advance the actual wavelength dispersion amount in the optical transmission line in use, or by estimating the wavelength dispersion amount from the transmission line length and a span loss amount based on the optical fiber specifications, the wavelength dispersion amount required for the dispersion compensation fiber is generally determined. However, in the cases of the optical add-drop method shown in FIG. 24B, and in the optical cross-connect method shown in FIG. 24C, it is anticipated that application of a technique like those described above will be difficult, for the following reasons:

In an optical network having optical cross-connect functions, for example, generally if there are N nodes, there exist N×N logical paths, as is seen from FIG. 24C. Furthermore, if a plurality of paths (routes) are conceivable to reach the same node, there exist an even greater number of path combinations.

In order to perform transmission without causing faults even when switching paths in the midst of such a large number of paths, it is safest to perform complete dispersion compensation for all paths in advance. This, however, limits the freedom of switching configurations; and because major changes in optical fiber characteristics due to path switching are conceivable, as for example when changing from single-mode fiber (SMF) to nonzero dispersion shifted fiber (NZDSF), it is difficult to adjust the wavelength dispersion amount of all paths to zero.

Further, it is unrealistic to attempt to measure wavelength dispersion amount in advance for all of a huge number of paths; and in cases where new paths are added, measurements for all the newly added paths must be performed once again. In such cases there is a problem that lines in use must be temporarily interrupted.

Also, a method in which a single dispersion compensation fiber is used to compensate for the dispersion amount of all WDM wavelengths at once is generally used due to its cost effectiveness. However, since the wavelength dispersion amount of the optical fiber is wavelength-dependent, the dispersion amount increases in propagating from the transmission node TERM1 to the reception node TERM2, as shown in FIGS. 25A and 25B, and optical dispersion compensation amounts differ among channels with the shortest and with the longest wavelengths.

Accordingly, in order to completely compensate for the wavelength dispersion amount, a design must also take into consideration the accumulated shifts in such wavelength dispersion amounts; however, it is extraordinarily difficult to perform complete dispersion compensation for all routes, while also taking wavelength dependency into account.

For the above reasons, there has been a problem that current methods for designing dispersion compensation amount cannot easily be applied to WDM optical transmission systems incorporating the functions of optical add-drop or optical cross-connect methods.

SUMMARY OF THE INVENTION

It is accordingly an object of the present invention to provide a method of measuring a wavelength dispersion amount of an optical transmission line, without disconnecting lines, and an optical transmission system which employs such a measuring method, performs dispersion compensation without either excess or deficit when switching optical transmission lines at an optical level, and realizes a high-quality transmission.

In order to achieve the above-mentioned object, a method of measuring a wavelength dispersion amount comprises: a first step of transmitting a measuring signal together with a main signal from a first node while a line is in operation; a second step of extracting and returning the measuring signal at an opposing node; and a third step of measuring a delay time required for the measuring signal to return at the first node, calculating a length of an optical transmission line between the nodes, and calculating the wavelength dispersion amount of the optical transmission line based on the length.

In other words, in the method of measuring the wavelength dispersion amount according to the present invention, by using a measuring signal other than a main signal during line operation, and receiving and returning this measuring signal at an opposing node, a delay time required for the return is measured, and from this delay time, the optical transmission line length is estimated. Since normally a dispersion coefficient for the optical transmission line is known in advance, by applying this dispersion coefficient to the length of the optical transmission line, the dispersion amount over the optical transmission line section can be calculated.

Thus in the present invention, the wavelength dispersion amount of the optical transmission line between the nodes can be determined without disconnecting the line.

As the above-mentioned measuring signal, a monitoring control signal which is wavelength-division-multiplexed into the main signal may be used.

Also, the above-mentioned measuring signal may comprise a variable-wavelength light source signal which is wavelength-division-multiplexed into the main signal; the first step may include a step of transmitting the measuring signals with a plurality of wavelengths, and the third step may include a step of calculating the wavelength dispersion amount from wavelength dependency of a plurality of delay times obtained by repeated measuring at the third step.

In other words, a variable-wavelength light source is prepared in addition to the main signal, and is used to transmit a measuring pulse; after this pulse is received at an opposing node and returned, the delay time required for the return is measured. By repeating this measurement while changing the wavelength, the wavelength dependency (delay time for each wavelength) of the measured delay times is obtained, whereby the wavelength dispersion can be determined.

As a result, there is no longer a need for information on the wavelength dispersion amounts for each type of optical fiber, and future expansion of optical fiber types can be accommodated flexibly.

Also, the variable-wavelength light source may also be used as the above monitoring control channel.

At the above-mentioned second step, the measuring signal may be returned either as an optical signal unchanged, or through an optical/electronic conversion.

The above-mentioned first step may include a step of transmitting the measuring signal over an up line or a down line of the first node, and the second step may include a step of returning the measuring signal over a same line while avoiding crosstalks.

Thus, instead of using a different optical transmission line as a return-trip line for returning the measuring signal, a bidirectional measuring signal can be obtained, without crosstalk, by a single optical transmission line.

As the above-mentioned measuring signals, signals of different frequencies may be used for the same line.

Also, a method of measuring a wavelength dispersion amount according to the present invention may comprise: a first step of transmitting a plurality of measuring signals of a wavelength bandwidth not used as a main signal, simultaneously from a first node while a line is in operation; and a second step of extracting the measuring signals at an opposing node, measuring delay times from arrival time differences of the signals, and calculating the wavelength dispersion amount from wavelength dependency of the delay times.

In other words, in the present invention, a plurality of measuring signals are placed in a wavelength bandwidth which is not used as a main signal, the measuring signals are transmitted simultaneously during line operation. The wavelength dependency of delay times is obtained from the delay differences in the arrival times of measuring signals at the opposing node. From this wavelength dependency, the wavelength dispersion amount is calculated.

In this case, different from the above-described method of the present invention, the delays between signals received at the opposing node are measured, so that the measuring signal need not be returned. This method is applied to a case where the up line and down line between the nodes are asymmetrical.

Also, by combining this method with the above variable-wavelength light source, more precise measurements of wavelength dependency can be obtained.

Furthermore, a method of measuring a wavelength dispersion amount according to the present invention may comprise: a first step of superimposing on a main signal a pulse signal at a frequency which does not substantially influence the main signal and transmitting the signal from a first node while a line is in operation; and a second step of measuring delay times from arrival time differences of the pulse signals at an opposing node and calculating the wavelength dispersion amount from wavelength dependency of the delay times.

That is, by superimposing on the main signal a signal which is much lower than the signal rate and with smaller modulation, it is used as the measuring signal for, at maximum, the number of WDM wavelengths; measuring signals are transmitted simultaneously from a plurality of wavelengths, the wavelength dependency of delay times is obtained from the differences in arrival time delays at an opposing node of the measuring signal, and the wavelength dispersion amount can then be calculated.

As an optical transmission system for realizing the above-mentioned method of measuring the wavelength dispersion amount comprising a plurality of nodes may include: a first node for transmitting a measuring signal together with a main signal while a line is in operation; and an opposing node for extracting and returning the measuring signal; the first node measuring a delay time required for the measuring signal to return, calculating a length of an optical transmission line between the nodes, and calculating the wavelength dispersion amount of the optical transmission line based on the length.

For the above-mentioned measuring signal, in the same way as the method according to the present invention, a monitoring control signal which is wavelength-division-multiplexed into the main signal may be used.

Also, as the above-mentioned measuring signal, a variable-wavelength light source signal which is wavelength-division-multiplexed into the main signal may be used; the first node may transmit the measuring signals with a plurality of wavelengths and may calculate the wavelength dispersion amount from wavelength dependency of a plurality of delay times obtained by repeated measuring at the first node.

Also, the above-mentioned opposing node may return the measuring signal either as an optical signal unchanged, or through an optical/electrical conversion.

Also, the above-mentioned first node may have crosstalk avoiding means and may transmit the measuring signal over an up line or a down line of the first node, and the opposing node may return the measuring signal over a same line using the crosstalk avoiding means.

Thus, similarly to the method of the present invention, a measuring signal can bidirectionally transmitted/received over a single optical transmission line, without crosstalks.

Also, as the above-mentioned measuring signals, in the same way as the method according to the present invention, signals of different frequencies may be used for the same line.

Also, an optical transmission system according to the present invention comprising a plurality of nodes may include: a first node for transmitting a plurality of measuring signals of a wavelength bandwidth not used as a main signal, simultaneously while a line is in operation; and an opposing node for extracting the measuring signals, measuring delay times from arrival time differences of the signals, and calculating a wavelength dispersion amount from wavelength dependency of the delay times.

Thus, similarly to the method of the present invention, the measuring signal need not be returned, and application is possible even when the up line and down line between the nodes are asymmetrical.

Also, an optical transmission system according to the present invention comprising a plurality of nodes may include: a first node for superimposing on a main signal a pulse signal at a frequency which does not substantially influence the main signal and transmitting the signal while a line is in operation; and an opposing node for measuring arrival times of the pulse signals and calculating a wavelength dispersion amount from wavelength dependency of delay times.

Furthermore, in the above-mentioned optical transmission system, in presence of a plurality of opposing nodes, the first node may select and switch over to an optimal optical transmission line based on the wavelength dispersion amounts calculated as mentioned above for the optical transmission lines.

That is, the first node can select the optical transmission line having, for example, the smallest wavelength dispersion amount, based on the wavelength dispersion amount for each optical transmission line as calculated from measuring signals returned from a plurality of opposing nodes, and can then perform switchover.

Also, in this case optical transmission line, selection and switchover can be performed for each wavelength.

For the above-mentioned measuring signal, one wavelength-division-multiplexed into the main signal according to a number of optical transmission lines may be used.

Also, the wavelength dispersion amounts calculated as mentioned above may be exchanged among the nodes, and the first node may collect and accumulate the wavelength dispersion amounts of the optical transmission lines.

In other words, by collecting and accumulating at the first node the wavelength dispersion amounts for each optical transmission line, calculated at a plurality of opposing nodes, an optical transmission line with, for example, the smallest wavelength dispersion amount can be selected and switchover performed, as described above.

Accordingly, since at optical add-drop nodes and optical cross-connect nodes the path is generally different for each wavelength, when the path changes due to the wavelength, the wavelength dispersion amounts can be accumulated for each wavelength.

Also, a variable dispersion compensator may be provided on a desired optical transmission line in order to compensate for the wavelength dispersion amount of the line.

That is, as described above, the dispersion compensation amount required is determined as a result of calculating the wavelength dispersion amount; hence by performing dispersion compensation at once for all wavelengths using a variable dispersion compensator (T-DC) positioned on the optical transmission line, dispersion compensation can be realized at a low cost.

The above-mentioned variable dispersion compensator may be provided for each wavelength, or for each group of wavelengths.

Furthermore, dispersion compensation fibers with different wavelength dispersion amounts, and an optical switch which switches over the fibers according to the wavelength dispersion amount required may be substituted for the variable dispersion compensator.

Furthermore, the above-mentioned first node may generate an alarm when the wavelength dispersion amount of the optical transmission line to be switched over becomes greater than the wavelength dispersion amount of a working optical transmission line upon a switchover of the optical transmission line.

Furthermore, the above-mentioned first node may again set the wavelength dispersion amount of the variable dispersion compensator in conformity with the wavelength dispersion amount of the optical transmission line to be switched over upon a switchover of the optical transmission line.

Furthermore, the wavelength dispersion amount may be compensated at a node in which a wavelength conversion is performed.

By this means, the waveform distortion due to wavelength dispersion at subsequent nodes can be held to a minimum.

A node used for the method of the measuring the wavelength dispersion amount and the optical transmission system comprises: first means for transmitting a measuring signal together with a main signal while a line is in operation; second means for extracting and returning the received measuring signal; and third means for calculating a length of an optical transmission line section from a delay time required for the measuring signal to return, and a wavelength dispersion amount of the optical transmission line section based on the length.

The above-mentioned measuring signal may comprise a monitoring control signal which is wavelength-division-multiplexed into the main signal.

Also, the above-mentioned measuring signal may comprise a variable-wavelength light source signal which is wavelength-division-multiplexed into the main signal; the first means may transmit the measuring signals with a plurality of wavelengths, and the third means may calculate the wavelength dispersion amount from wavelength dependency of a plurality of delay times obtained by repeated measuring at the third means.

Also, the above-mentioned second means may return the measuring signal either as an optical signal unchanged, or through an optical/electrical conversion.

Also, the above-mentioned first means may transmit the measuring signal over an up line or a down line, and the second means may return the measuring signal over a same line using crosstalk avoiding means.

Furthermore, a node according to the present invention may comprise: first means for simultaneously transmitting a plurality of measuring signals of a wavelength bandwidth not used as a main signal while a line is in operation; and second means for extracting received measuring signals, measuring delay times from arrival time differences of the signals, and calculating a wavelength dispersion amount from wavelength dependency of the delay times.

Furthermore, a node according to the present invention may comprise: first means for superimposing on a main signal a pulse signal at a frequency which does not substantially influence the main signal and transmitting the signal while a line is in operation; and second means for measuring delay times from arrival time differences of the received pulse signals, and calculating a wavelength dispersion amount from wavelength dependency of the delay times.

BRIEF DESCRIPTION OF THE DRAWINGS

FIGS. 1A and 1B are schematic diagrams showing an embodiment (1) of a method of measuring a wavelength dispersion amount and an optical transmission system according to the present invention;

FIGS. 6A and 6B are diagrams showing an embodiment (1) of a node (transmitting/receiving side) used in the present invention;

FIGS. 7A and 7B are diagrams showing an embodiment (2) of a node (transmitting/receiving side) used in the present invention;

FIGS. 8A and 8B are schematic diagrams showing an embodiment (3) of a method of measuring a wavelength dispersion amount measurement and an optical transmission system according to the present invention;

Throughout the figures, like reference numerals indicate like or corresponding components.

DESCRIPTION OF THE EMBODIMENTS

FIGS. 1A and 1B show an embodiment (1) of a method of measuring a wavelength dispersion amount and an optical transmission system according to the present invention. In this embodiment, nodes 1 and 2 composing an optical transmission system are connected with an optical fiber transmission line 3 composed of outgoing and incoming paths, where a main signal $S_M$ goes back-and-forth.

This system is configured such that a monitoring control channel signal $S_{cc}$, that is the measuring signal, is transmitted from the transmission node, the node 1 (the first node), to the reception node, to the node 2 (opposing node), and is returned at the opposing node 2 to the node 1.

As shown in FIG. 1B, this monitoring control channel signal $S_{cc}$ is wavelength-division-multiplexed into the main signal $S_M$.

At the node 1, a delay time T1 required for the return of the monitoring control channel signal $S_{cc}$ is measured, and from this delay time T1 a length L (km) of an optical fiber transmission line 3 is obtained.

Also, the node 1 extracts, from information on optical fiber transmission line type registered by a maintenance person, dispersion coefficients (ps/nm/km) specific to all wavelengths for the optical fiber transmission line 3, and can calculate the wavelength dispersion amount (ps/nm) for the section between nodes 1 and 2.

Figure 2A:
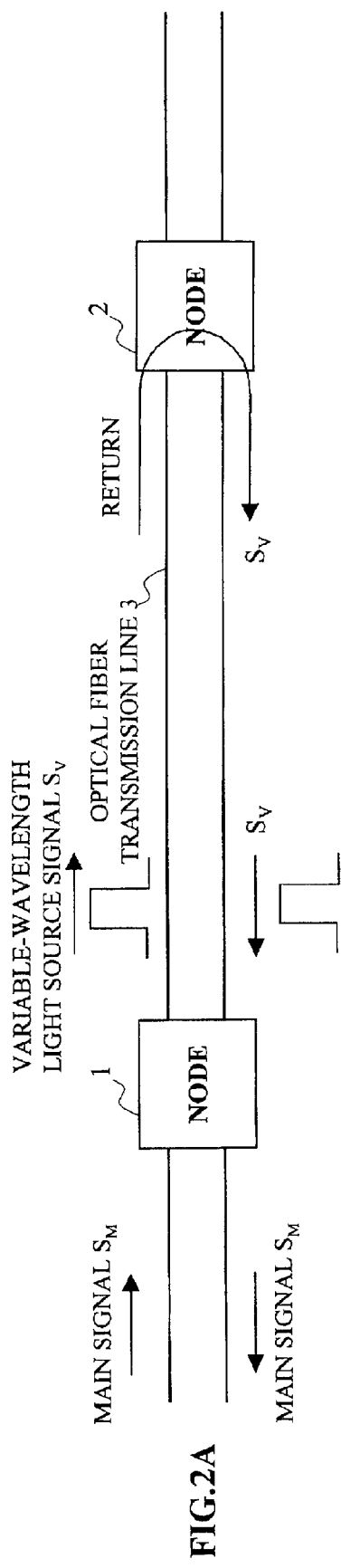
FIGS. 2A and 2B are schematic diagrams showing an embodiment (2) of a method of measuring a wavelength dispersion amount and an optical transmission system according to the present invention.
Figure 2B:
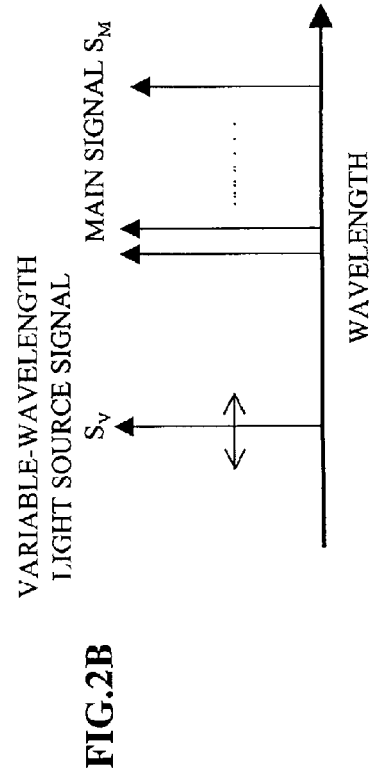

FIGS. 2A and 2B show an embodiment (2) of the method of measuring the wavelength dispersion amount and the optical transmission system according to the present invention. In this embodiment, different from the above embodiment (1), a variable-wavelength light source signal $S_v$ generated by a variable-wavelength light source is used as the measuring signal.

At the node 1, this variable-wavelength light source signal $S_v$ is used to measure the delay time T1 required for return, similarly to the above embodiment (1); in this case, however, from the wavelength dependency of the delay times (the delay times at different wavelengths) obtained, by repeating measurements while varying the wavelength, the wavelength dispersion amount can be calculated, using the following equation:

$$\beta(\lambda) = -dT(\lambda)/d\lambda \qquad \text{Eq.(1)}$$

As a result, in contrast with the above embodiment (1), information on the wavelength dispersion amount of different types of the optical fiber is no longer necessary, and future expansion of optical fiber types can be flexibly accommodated. Also, the variable-wavelength light source can also be used for wavelength/controlling channel signals (OSC).

Figure 3A:
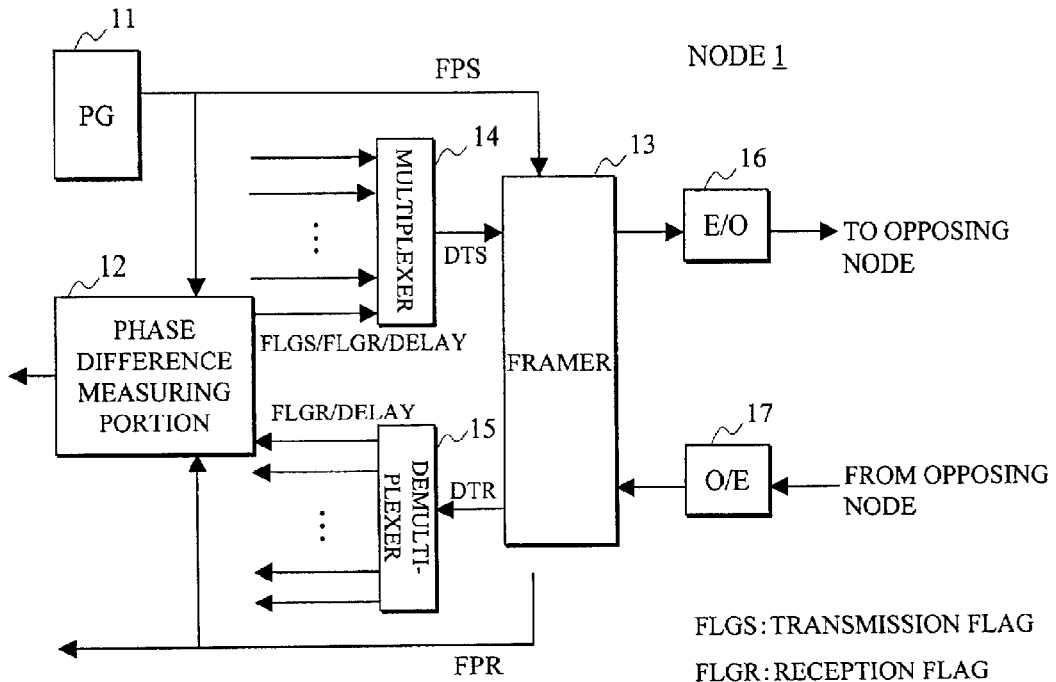
FIGS. 3A and 3B are diagrams showing an embodiment of a node (transmitting side) used in the present invention.
Figure 3B:
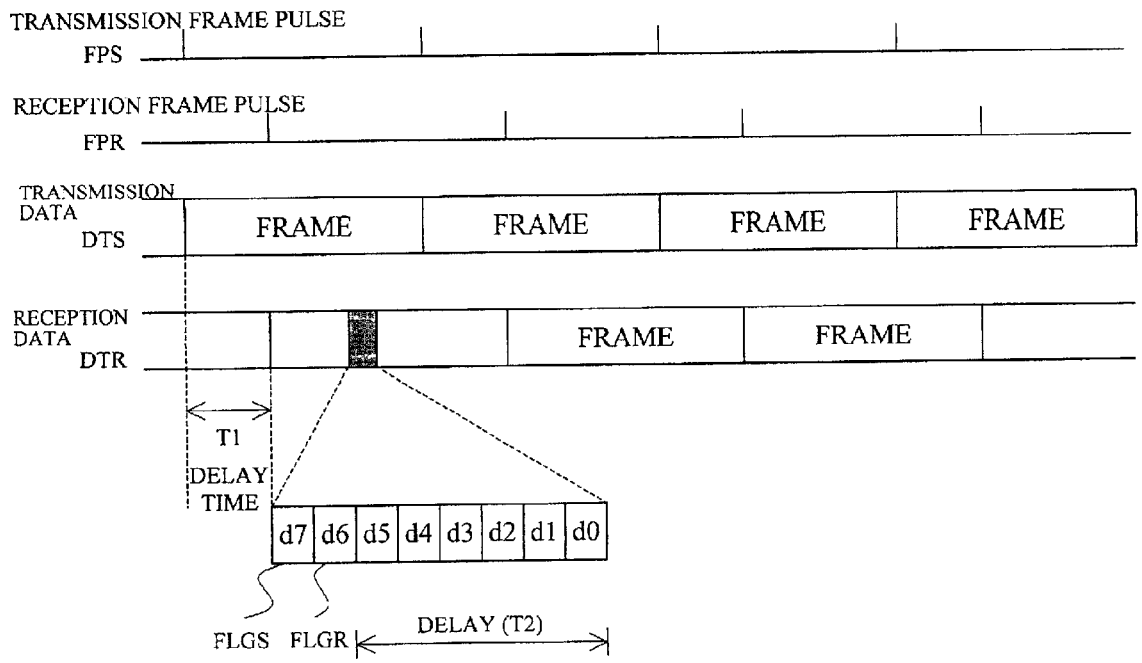

FIGS. 3A and 3B show an embodiment of the node 1 on the transmitting side in the above embodiments (1) and (2).

First, a circuit arrangement is shown in FIG. 3A. This circuit arrangement comprises a pulse generator (PG) 11; a phase difference measuring portion 12, to which a pulse signal from the pulse generator 11 is input as a transmission frame pulse FPS; a framer 13; a multiplexer 14, which multiplexes bits FLGRS, FLGR, and DELAY described below, into main-signal data to be provided to the framer 13; a demultiplexer 15, which demultiplexes the main-signal data and the bits FLGR and DELAY from the framer 13; an electrical/optical converter 16, which converts an electrical signal from the framer 13 into an optical signal for output to an opposing node; and an optical/electrical converter 17 which converts the optical signal received from the opposing node into the electrical signal.

The received frame pulse FPR extracted by the framer 13 is provided to the phase difference measuring portion 12.

First, the phase difference measuring portion 12 prepares, within the transmitted/received frame, a transmission flag FLGS and a reception flag FLGR, which are measuring signals, as well as a phase difference bits DELAY (six bits in the example of FIG. 3B) in order to insert a phase difference of the transmission/reception frame, as shown in FIG. 3B, to be provided to the multiplexer 14.

Figure 4A:
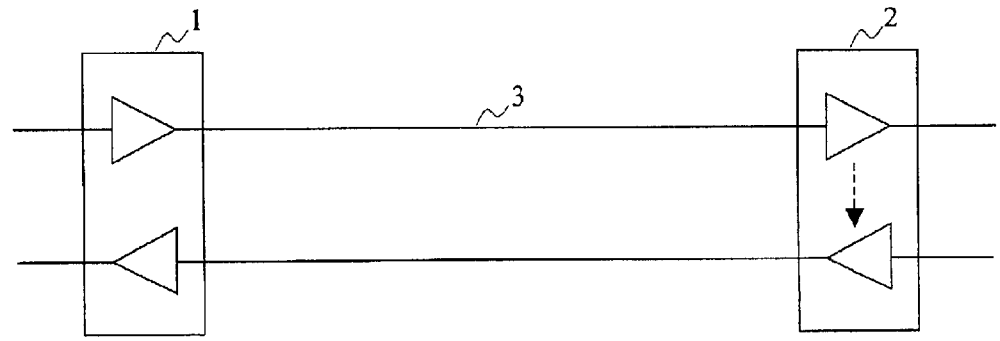
FIGS. 4A and 4B are schematic diagrams of a calculation of a wavelength dispersion amount according to the present invention.
Figure 4B:
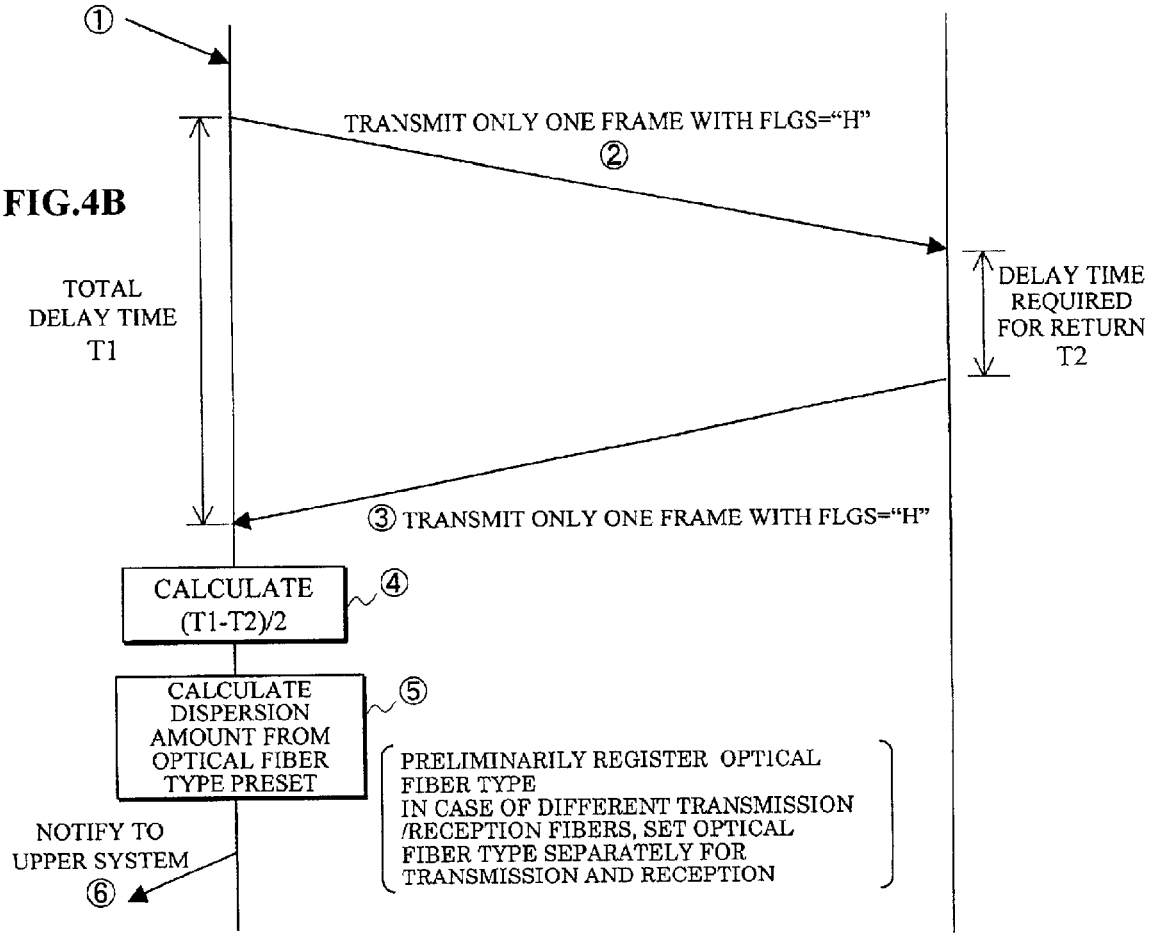

As indicated by ① and ② of FIG. 4B, at the start of the measurements the transmission flag FLGS is set to "H".

The multiplexer 14 sends the data DTS, in which the above bits FLGS/FLGR/DELAY are multiplexed into the main signal, to the framer 13. The framer 13 prepares a one-frame signal, to which the transmission frame pulse FPS from the pulse generator 11 is added. The electrical/optical converter 16 converts the signal into the optical signal, and transmits same to the opposing node (node 2 in embodiments (1) and (2)).

The opposing node, having received the frame signal, inserts the phase difference (T2) of the transmission/reception frame into the phase difference bits DELAY, and returns the frame signal with the reception frame pulse FPR set to "H", as indicated by ③ of FIG. 4B (see FIG. 4A).

At the node 1 having received the returned frame signal, the signal is passed through the optical/electrical converter 17 and the framer 13, demultiplexed into the reception flag FLGR and the phase difference bits DELAY at the demultiplexer 15, and is provided to the phase difference measuring portion 12.

At the phase difference measuring portion 12, by subtracting the phase difference (T2) written in the phase difference bits DELAY from the total delay time (T1) between the transmission flag FLGS and the reception flag FLGR arising during the round trip of the signal, the time required for the round trip can be measured.

From the delay time (T1–T2) times the group rate, within the optical fiber transmission line 3, divided by 2 (see ④ of FIG. 4B), the length L of the transmission line 3 is obtained. Furthermore, the dispersion coefficient based on the information on the type of the optical fiber enables the wavelength dispersion amount to be obtained (see ⑤ of FIG. 4B).

A situation in which the types of the optical fiber in the up line and the down line are different can be handled by providing different group rates and dispersion coefficients for each. Also, by using for the dispersion coefficient, data which also include the wavelength dependency, calculations can be performed which incorporate the WDM wavelength dependency.

Figure 5A:
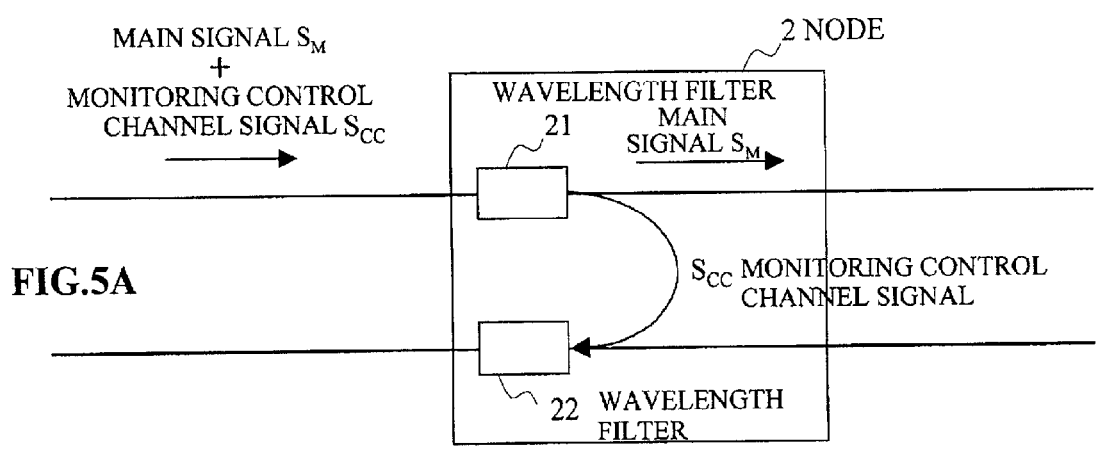
FIGS. 5A and 5B are block diagrams showing an embodiment of a node (receiving side) used in the present invention.
Figure 5B:
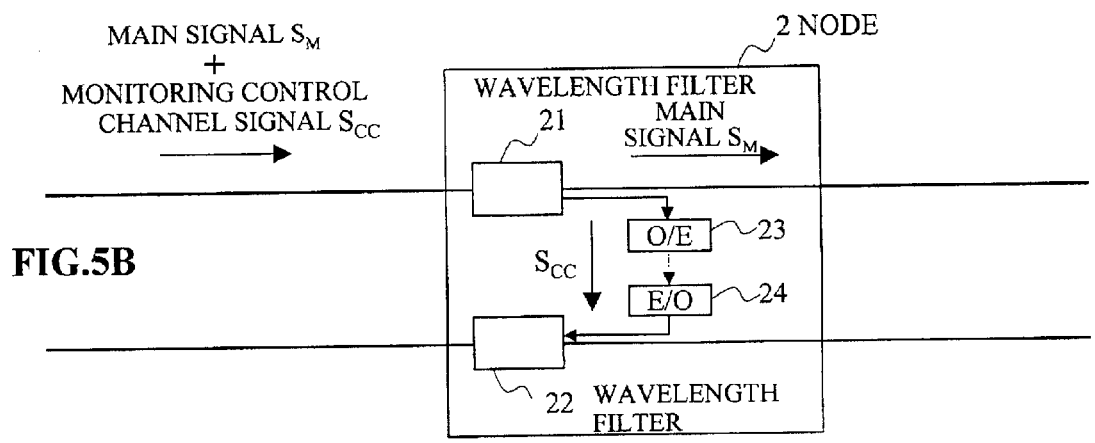

FIGS. 5A and 5B show an embodiment of the receiving-side node 2, shown in FIGS. 1A and 2A. In the embodiment shown in FIG. 5A, a configuration is adopted in which the optical signal is returned without modifications; consequently the node 2 is provided with wavelength filters 21 and 22.

Accordingly, when the main signal $S_M$ and the monitoring control channel signal $S_{cc}$, sent from the node 1 are inputted to the node 2, only the monitoring control channel signal $S_{cc}$ is demultiplexed from the main signal $S_M$ by the wavelength filter 21, and returned to the wavelength filter 22. The monitoring control channel signal $S_{cc}$ is thus returned from the wavelength filter 22 to the node 1.

In this case, a configuration may be employed in which optical amplification is performed, and the amplitude is restored before returning the signal; alternatively, a configuration is possible in which, when returning the signal, instead of returning all the power, an optical coupler is used for branching, and a portion of the power undergoes an optical/electrical conversion.

In FIG. 5B, a configuration is adopted in which the optical input signal is not returned without modifications, but is first converted into an electrical signal, then reconverted to an optical signal and returned.

That is, in addition to the configuration (1) of FIG. 5A, at the node 2 an optical/electrical converter 23 and an electrical/optical converter 24 are provided, the monitoring control channel signal $S_{cc}$ demultiplexed by the wavelength filter 21 is temporarily converted into an electrical signal by the electrical/optical converter 23, and after being dropped within the node 2, is reconverted into an optical signal by the electrical/optical converter 24, and is then returned to the node 1 via the wavelength filter 22.

While in the embodiment of the node 2 shown in FIGS. 5A and 5B, only a configuration in which the signal is returned is shown, in the embodiment of FIGS. 6A and 6B, the embodiment (1) of the node 1 having functions for both transmission and reception is shown.

In other words, wavelength filters 31 and 32 are respectively provided in the node 1 for both the up and down lines, and the measuring signal $S_{cc}$ demultiplexed by the wavelength filter 31 is provided to the optical/electrical converter 34 via an optical circulator 33 as crosstalk avoiding means.

The reception of the up line measuring signal $S_s$ by this optical/electrical converter 34 triggers that the down line measuring signal $S_s$ from the electrical/optical converter 35 is transmitted to the opposing node from the wavelength filter 31, via the optical circulator 33.

Similarly for the wavelength filter 32, an optical circulator 36, an optical/electrical converter 37, and an electrical/optical converter 38 are provided; the down line measuring signal $S_s$ sent from the opposing node on the right side is provided to the optical/electrical converter 37 from the optical filter 32 via the optical circulator 36, triggering that the up line measuring signal SS from the electrical/optical converter 38 is transmitted to the opposing node from the wavelength filter 32.

In this way, by avoiding crosstalks between signals in the up line and down line, bidirectional measuring signals are realized in a single optical fiber.

FIGS. 7A and 7B show an embodiment (2) which is a modification of the embodiment (1) shown in FIGS. 6A and 6B. This embodiment (2) differs in that, in place of the optical circulators 33 and 36, wavelength filters 330 and 360 are used.

That is, as the measuring signal in this embodiment, signals $S_{s1}$ and $S_{s2}$ with two different wavelengths are used, and these are respectively the up signal and the down signal. In this embodiment, there is no need to use a different optical fiber for the return-trip line, and by using signals with different wavelengths as the measuring signals for the up line and the down line so as to avoid crosstalks between signals, bidirectional measuring signals are realized in a single optical fiber.

FIGS. 8A and 8B show an embodiment (3) of the method of measuring the wavelength dispersion amount and the optical transmission system according to the present invention. In this embodiment, in contrast with the above embodiments (1) and (2), the measuring signal is transmitted from the node 1, and instead of being returned at the opposing node 2, the wavelength dispersion amount is measured within the node 2.

That is, as shown in (2) FIG. 8B, a pulse S1 (wavelength λ1) and a pulse S2 (wavelength λ2) are, for example, allocated as two measuring signals in a wavelength bandwidth not used for the main signal $S_M$. These measuring pulses S1 and S2 are simultaneously transmitted from the node 1.

At the opposing node 2, the delay time Δt of the arrival times of these measuring pulses S1 and S2 is measured.

Using the wavelength dependency of the delay times obtained from Eq.(1) as indicated in the above embodiment (2), the wavelength dispersion amount can be calculated for each wavelength.

In this way, since there is no need to return the measuring signal, application is possible in cases where the up line and down line are asymmetrical, such as when a node 4 intervenes between the node 1 and the node 2, as shown in FIG. 8A.

In this case, as a plurality of light sources, two monitoring control channel signals prepared respectively may be used in, for example, the system of C band+L band. Also, by using a plurality of variable-length light sources with different operating wavelengths, the above wavelength dependency can be measured with a higher accuracy.

Figure 9A:
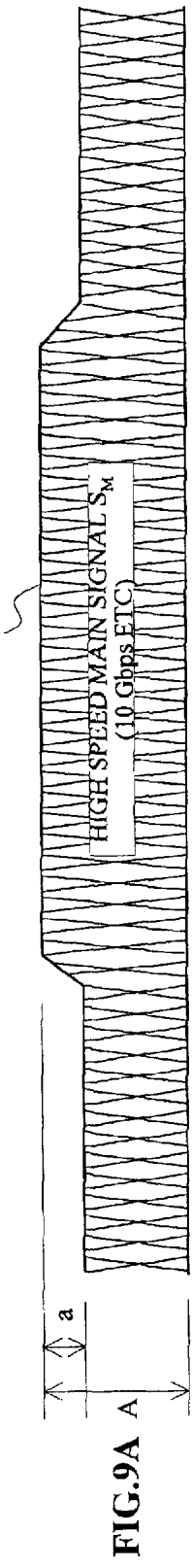
FIGS. 9A and 9B are schematic diagrams showing embodiment (4) of a method of measuring a wavelength dispersion amount measurement and an optical transmission system according to the present invention.
Figure 9B:
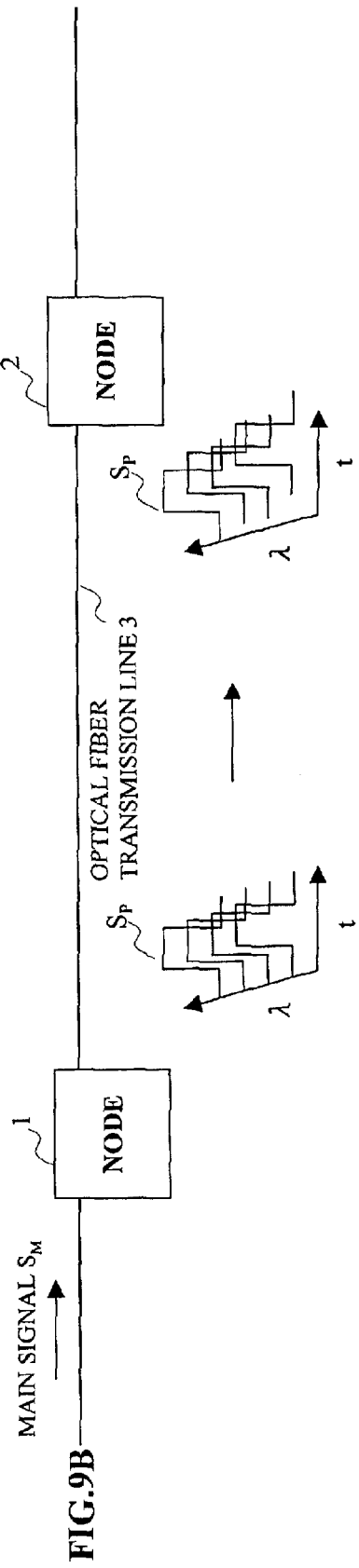

FIGS. 9A and 9B show an embodiment (4) of the method of measuring the wavelength dispersion amount and the optical transmission system according to the present invention. In this embodiment, as shown in FIGS. 9A and 9B, by superimposing a pulse signal $S_p$ which is sufficiently lower than the transmission rate of the main signal $S_M$ and has a small modulation (a/A) onto the main signal $S_M$, the wavelength dispersion measuring signal for, at maximum, the number of WDM wavelengths is available; measuring pulses are transmitted simultaneously at a plurality of wavelengths; from the delay differences in the arrival times between the pulses at the opposing node 2, a plurality of delay times are determined; and the dispersion amount at each wavelength can be obtained in the same way as the above from the wavelength dependency of the delay time.

As an example, since the main signal is a high-speed signal such as 10 Gbps, as shown in the FIG. 9A, a low-speed signal such as 1 Mbps may be used for the measuring signal, and the modulation is also chosen so as not to influence the transmission characteristic of the main signal. It is also possible to superimpose measuring signals on all signals which are to be wavelength-multiplexed, or superimposing and measuring may be performed for only a portion of the wavelengths.

Moreover, by performing modulation in a direction to reduce the amplitude of half the wavelengths and increase the amplitude of the other half wavelengths, instead of applying modulation in the same direction for all the wavelengths, and by using a method of suppressing fluctuations in the overall power, it is possible to suppress level fluctuations of the optical output signal.

In this embodiment, similarly to the above, since there is no need to return the measuring signal, application is also possible in a case where the up line and down line are asymmetrical.

Figure 10:
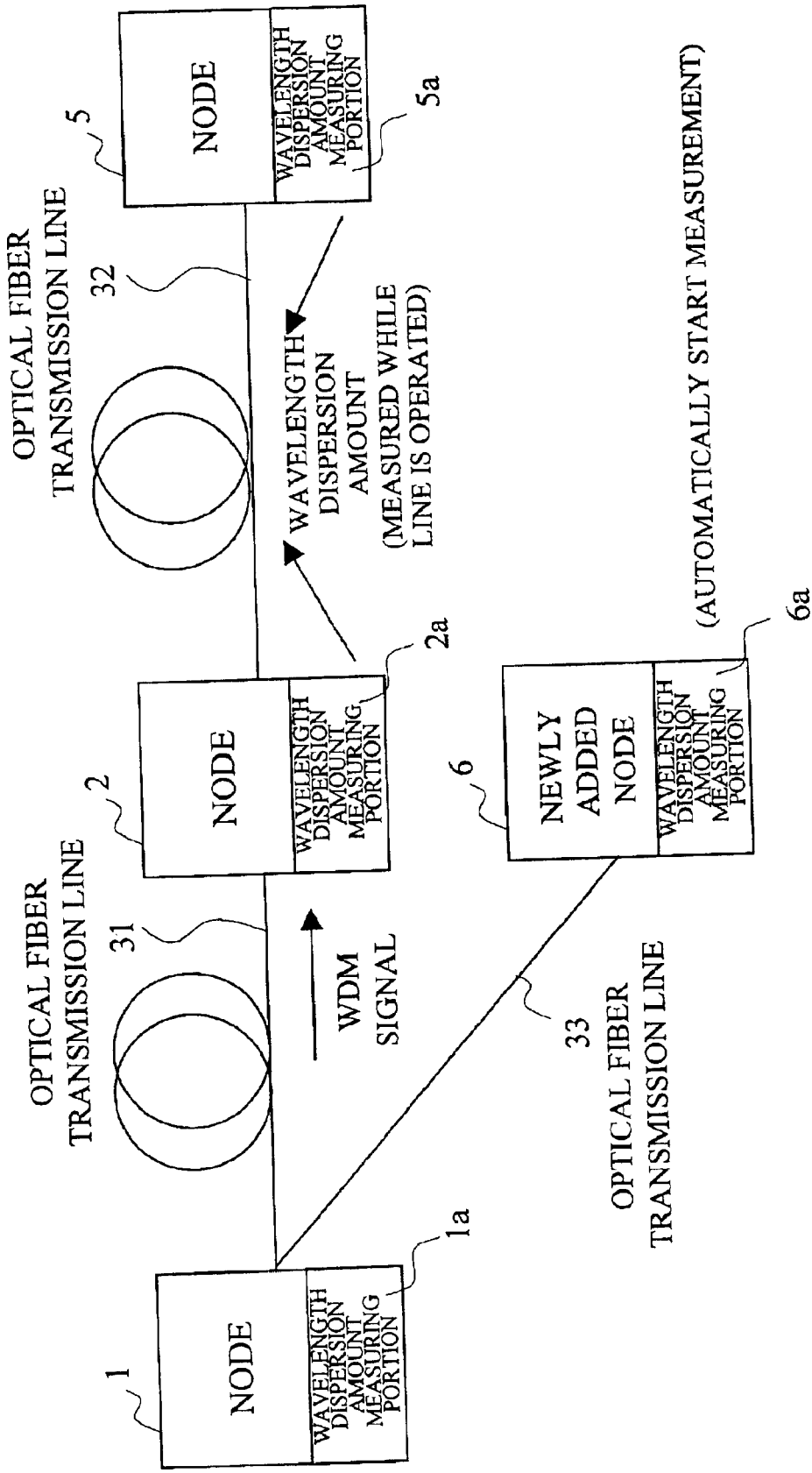
FIG. 10 is a block diagram showing an optical transmission system example (1) for measuring a wavelength dispersion amount according to the present invention.

In each of the above embodiments, a method of measuring the wavelength dispersion amount between two nodes and optical transmission system having been described as an example; FIG. 10 shows an example (1) of an optical transmission system to measure wavelength dispersion amount in a case where there are a plurality of opposing nodes.

That is, a state is shown in which not only the node 1 and the node 2 are connected to the optical fiber transmission line 31, but also the node 2 is connected to a node 5 via another optical fiber transmission line 32. In this state, the node 1 is a transmission node as an optical terminating node (TERM), the node 5 is likewise a reception node as an optical terminating node (TERM), and the node 2 composes a relay amplifier node (ILA), an optical add-drop node (OADM) or an optical cross-connect node (OXC).

At each of the nodes 1, 2, and 5, wavelength dispersion amount measuring portions 1a, 2a, and 5a are respectively provided, having the circuit configuration shown in FIG. 3A, to measure the wavelength dispersion amount. These wavelength dispersion amount measuring portions 1a, 2a, and 6a can measure the wavelength dispersion amount during line operation, as described above. The wavelength dispersion amount measurements in this case may be performed routinely during line operation.

That is, by the embodiments (1) and (2) shown in FIGS. 1A, 1B and FIGS. 2A, 2B, the wavelength dispersion amount in the optical transmission line 31 can be measured at the node 1, and the wavelength dispersion amount in the optical transmission line 32 can be measured at the node 2. Alternatively, by the embodiments (3) and (4) of FIGS. 8A, 8B and FIGS. 9A, 9B, the wavelength dispersion amount in the optical transmission lines 31 and 32 can be measured at the nodes 2 and 5, respectively.

In a case where a new node 6 is added, as shown in FIG. 10, the node 1 can similarly measure the wavelength dispersion amount in the optical transmission line 33 for the node 6.

At the wavelength dispersion amount measuring portions 1a, 2a, 5a, and 6a, further comprising a circuit configuration for transmission such as shown in FIGS. 6A and 7A, the wavelength dispersion amount in both optical transmission lines 31 and 32 can be measured at e.g. the node 2 during line operation.

The measurement of the wavelength dispersion amount may also be performed sequentially, at the time of addition of a new node or startup of a new span, and in case of network structure changes such as upon adding/reducing wavelengths, or switching optical add-drop nodes or optical cross-connect nodes. Also, when adding a new span, measuring is begun for this path, and the wavelength dispersions amount for the transmission lines between all nodes may be monitored routinely.

Accordingly, in the WDM optical transmission system including the optical add-drop nodes and the optical cross-connect nodes, which enable an unlimited number of network structures, it becomes possible to accurately grasp the wavelength dispersion amount of the transmission line when switching paths or expanding transmission lines.

As the objects for the measurement of the wavelength dispersion amount as described above, the optical transmission lines established between the nodes, and the dispersion compensation fibers and the filters set up within the nodes, and optical components such as optical amplifiers, are conceivable.

Among these, the optical transmission lines between the nodes used for the optical path switching, or the like may be changed, and in addition may be freely replaced by the maintenance person. Therefore, the frequency of modifications is considered to be high.

On the other hand, in-device optical components such as dispersion compensation fibers, filters, and optical amplifiers are not changed, so long as there are no component faults, reclamation, or the like.

Figure 11:
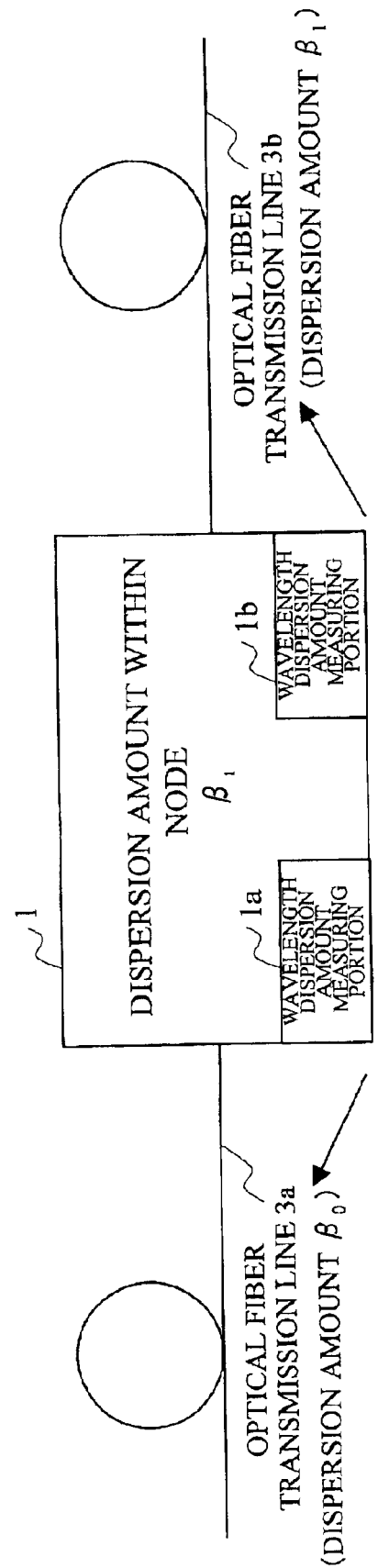
FIG. 11 is a diagram showing an example in which a wavelength dispersion amount within a node is not taken into account in a measurement of a wavelength dispersion amount according to the present invention.

Therefore, as shown in FIG. 11, wavelength dispersion amount measuring portions 1a and 1b can be provided e.g. in the node 1 where the wavelength dispersion amount measuring portion 1a measures the dispersion amount $\beta_0$ of the optical transmission line 3a, and the wavelength dispersion amount measuring portion 1b measures the wavelength dispersion amount $\beta_1$ of the optical fiber transmission line 3b. As for the wavelength dispersion amount $\beta_i$ within the node 1, the number of measurements can be reduced by using a value preliminarily registered.

Figure 12:
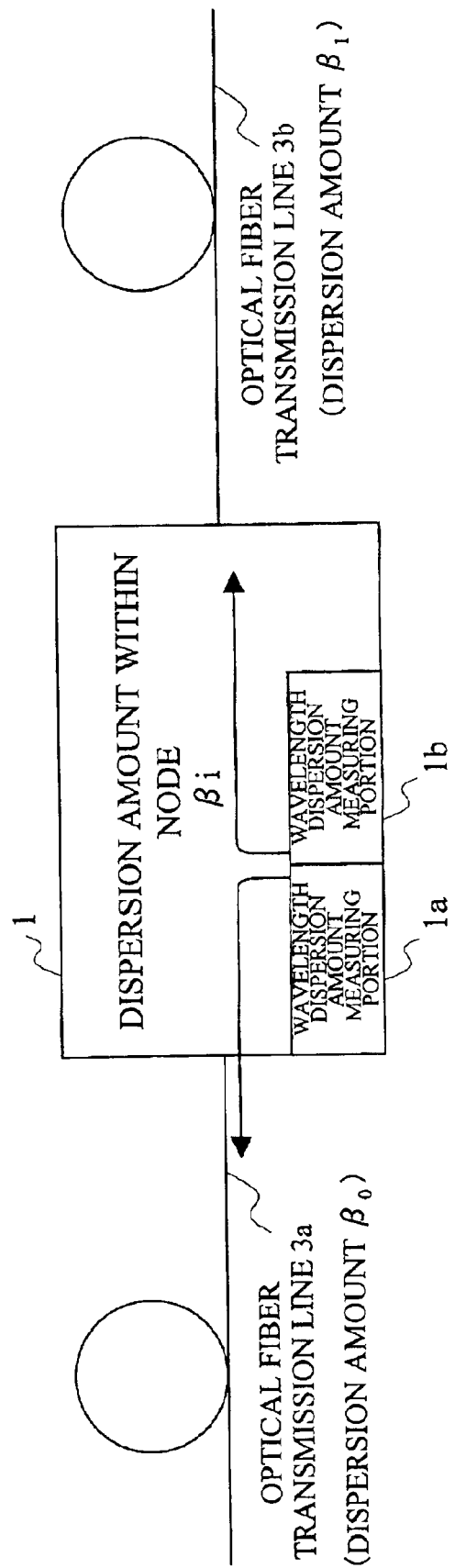
FIG. 12 is a diagram showing an example in which a wavelength dispersion amount within a node is taken into account in a measurement of a wavelength dispersion amount according to the present invention.

Alternatively as shown in FIG. 12, not only the wavelength dispersion amount of the optical transmission line established between the nodes, but also the wavelength dispersion amount of the optical components such as the dispersion compensation fibers, fibers, optical amplifiers set within the node are measured. Therefore, the wavelength dispersion amount measuring portions 1a and 1b may respectively measure the wavelength dispersion amount not only of the optical transmission lines 3a and 3b, but also the total wavelength dispersion amount including the dispersion $\beta_i$ within the node.

Thus, if there are modifications to the components within the node due to a fault or for some other reason, line operation can be continued without newly setting the wavelength dispersion information.

In the optical transmission system example (1) shown in FIG. 10, the wavelength dispersion amount measuring portion is provided at each node; however, among the transmission nodes, the reception nodes, the relay amplifier nodes, the optical add-drop nodes, and the optical cross-connect nodes in the WDM optical transmission system, optical path switching is executed only for the optical add-drop nodes and the optical cross-connect nodes.

Figure 13:
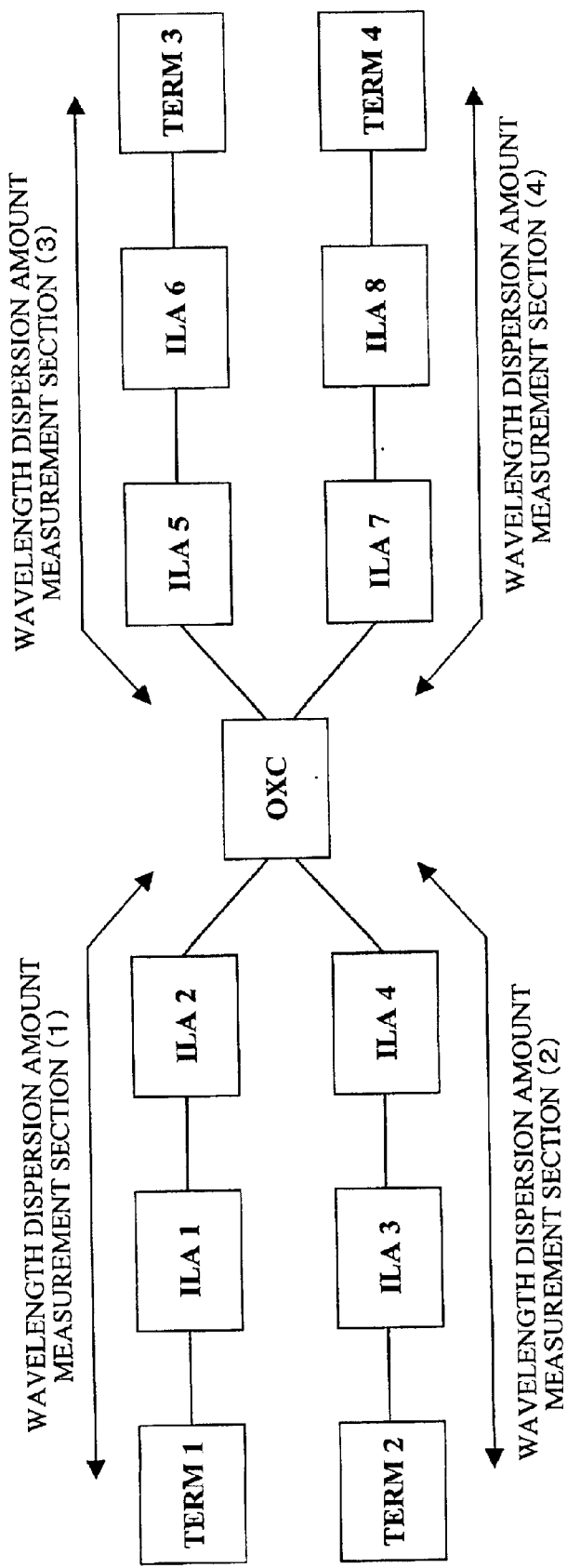
FIG. 13 is a block diagram showing an optical transmission system example (2) for measuring a wavelength dispersion amount according to the present invention.

Accordingly, for such an optical transmission system, when the paths between four optical terminating nodes TERM1 through TERM4 are switched by a single optical cross-connect node OXC as shown in FIG. 13, by performing the wavelength dispersion amount measuring from the optical cross-connect node OXC for the measurement sections (1) through (4), the number of nodes performing measuring can be reduced.

However, in this case the measuring signals must be passed through the relay amplifier nodes ILA1, ILA2 existing between the optical terminating node TERM1 and the optical cross-connect node OXC; and similarly for the other relay amplifier nodes ILA3 to ILA8.

Figure 14:
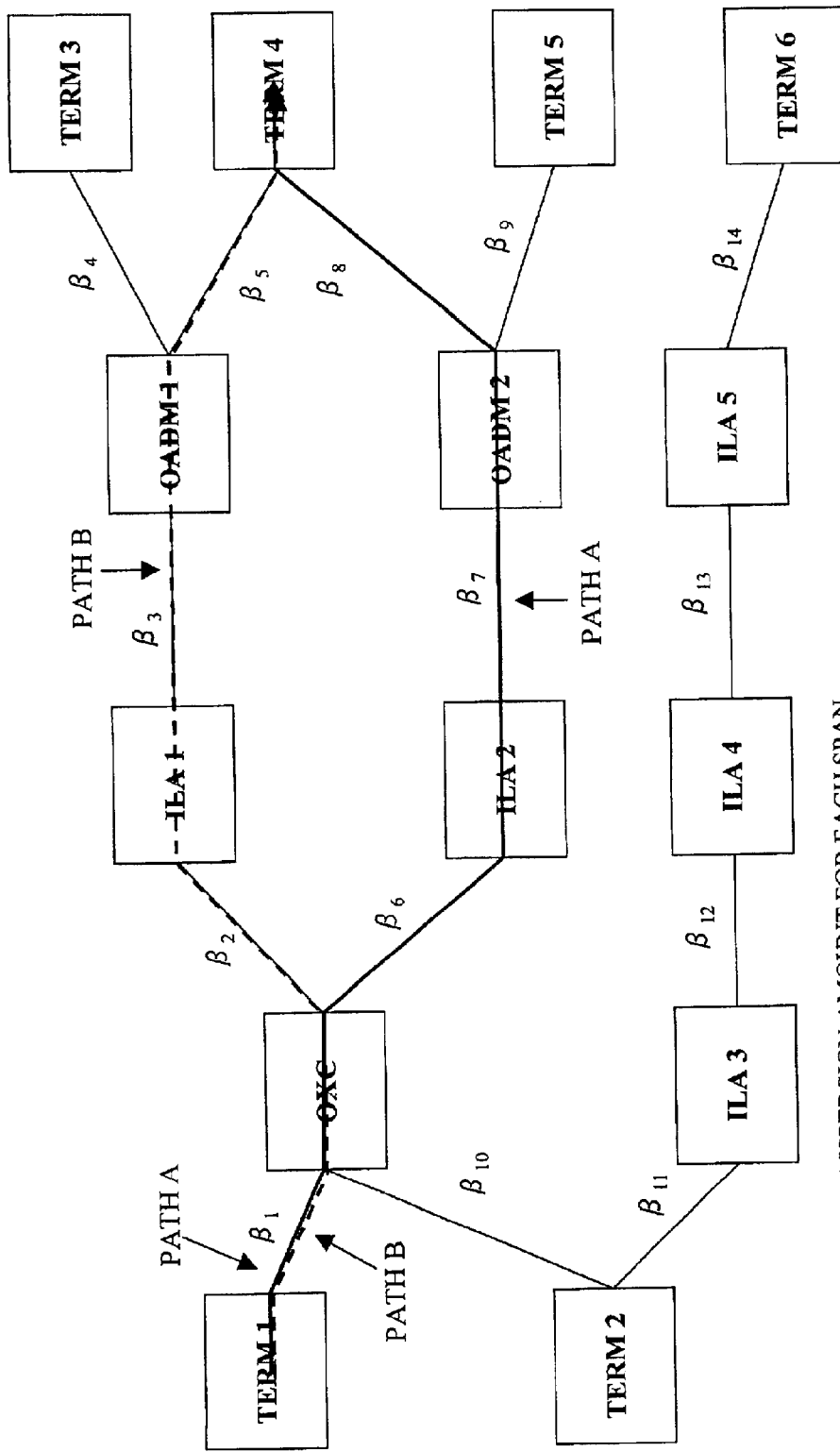
FIG. 14 is a block diagram showing an embodiment which selects an optimum path in an optical transmission system example (3) for measuring a wavelength dispersion amount according to the present invention.

FIG. 14 shows an optical transmission system example (2) of FIG. 13, expanded to include various other nodes. That is, the optical terminating nodes TERM1 and TERM2, which are transmission nodes, are both connected to the optical cross-connect node OXC, and this optical cross-connect node OXC is further connected respectively to the relay amplifier nodes ILA1 and ILA2. The relay amplifier node ILA1 is further connected to the optical add-drop node OADM1. Similarly, the relay amplifier node ILA2 is also connected to the optical add-drop node OADM2.

The optical add-drop node OADM1 is further connected to the optical terminating nodes TERM3 and TERM4 as reception nodes, and the optical add-drop node OADM2 is connected to the optical terminating nodes TERM4 and TERM5.

Further, the optical terminating node TERM2 is connected, via the optical relay amplifier nodes ILA3 to ILA5, to the optical terminating node TERM6, which is a reception node.

It is to be noted that the $\beta_i$ values indicated between the nodes indicate the wavelength dispersion amounts between the respective nodes.

Accordingly, by exchanging the wavelength dispersion amounts $\beta_i$ between the various nodes, the measured values of the dispersion amounts between nodes can be accumulated, and the dispersion amounts for all wavelengths accumulated over each optical path can be monitored. It is to be noted that at the optical add-drop nodes and the optical cross-connect nodes, the path generally changes depending on the wavelength, and so cumulative values must be compiled for each wavelength.

In this way, the total value of the wavelength dispersion amounts for each path is known, so that the path with the smallest wavelength dispersion amount can be selected as an optimal path.

In other words, in terms of the example of FIG. 14, by comparing the cumulative value of wavelength dispersion amounts ($\beta_A=\beta_1+\beta_6+\beta_7+\beta_8$) for the path A, shown by a thick line (TERM1→OXC→ILA2→OADM2→TERM4) with the cumulative value of wavelength dispersion amounts ($\beta_B=\beta_1+\beta_2+\beta_3+\beta_5$) for the path B, shown by a dashed line (TERM1→OXC→ILA1→OADM1→TERM4), if for example the path A has a smaller wavelength dispersion amount ($\beta_A<\beta_B$), the optical cross-connect node OXC and optical add-drop node OADM2 will select the path A.

Figure 15:
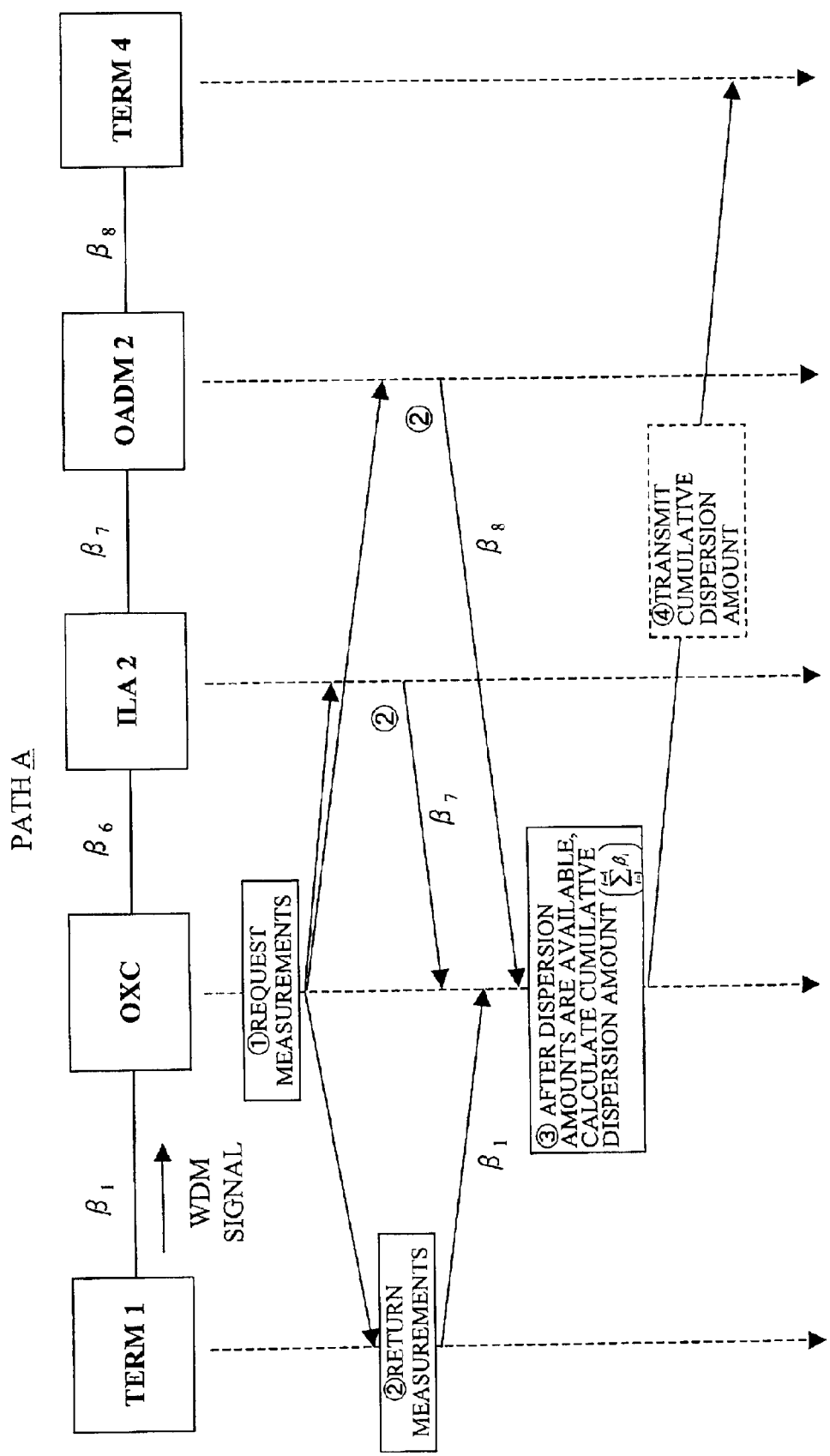
FIG. 15 is a block diagram showing a procedure example (1) of a wavelength dispersion amount collection according to the present invention.

FIG. 15 shows a procedure example (1) of a wavelength dispersion amount collection in the path B shown in FIG. 11. In this embodiment, the optical cross-connect node OXC is preset as a node for collecting the wavelength dispersion amounts for this path B.

Accordingly, the optical cross-connect node OXC first ① requests the measured value of the wavelength dispersion amount from the transmission node TERM1, the relay amplifier node ILA2, and the optical add-drop node OADM2.

② Responsively, the transmission node TERM1, the relay amplifier node ILA2, and the optical add-drop node OADM2 return the wavelength dispersion amounts $\beta_1$, $\beta_7$, and $\beta_8$ which they have respectively measured. Then, ③ when the optical cross-connect node OXC has received the wavelength dispersion amounts, it calculates the cumulative value $\Sigma\beta_i$.

④ Also, if necessary, the total of the wavelength dispersion amounts is transmitted to the node TERM4.

This sequence is repeated with a fixed period.

In the case of the procedure example (1) shown in FIG. 15, there is one optical cross-connect node, and so it is sufficient that the optical cross-connect node OXC monitor all the paths. However, if there are a plurality of optical cross-connect nodes, then it means that there exist a plurality of master nodes, and so the range for monitoring must be preset.

Figure 16:
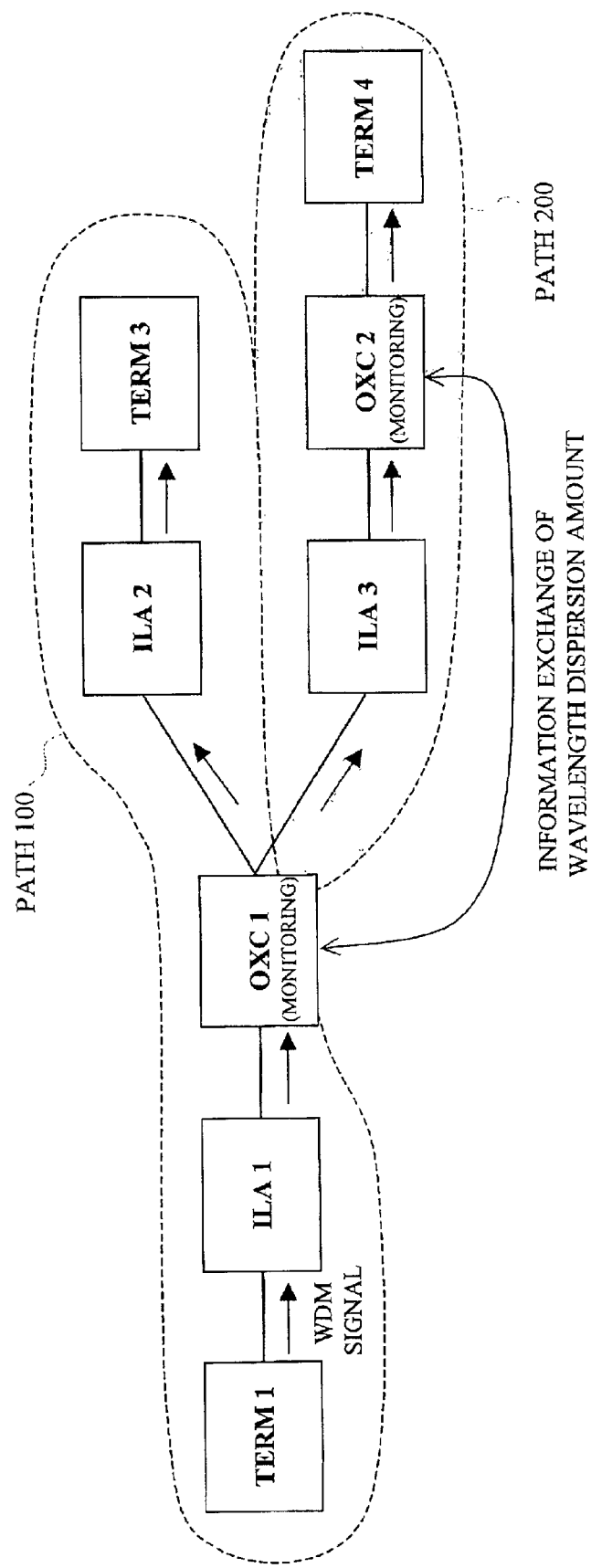
FIG. 16 is a block diagram showing a procedure example (2) of a wavelength dispersion amount collection according to this invention.

In the procedure example (2) of the wavelength dispersion amount collection shown in FIG. 16, for accommodating such a case, the optical cross-connect node OXC1 is set so as to monitor a path 100 comprising the optical terminating node TERM1, the relay nodes ILA1 and ILA2, and the optical terminating node TERM3; and the other optical cross-connect node OXC2 is set so as to monitor a path 200 comprising the relay amplifier node ILA3 and the optical terminating node TERM4, thereby enabling respective functions to be shared.

The wavelength dispersion amount information held by each is exchanged with each other, and if necessary a setting value is transmitted to another node.

As mentioned above, if the wavelength dispersion amount is determined at the time of determining the optimum path, this wavelength dispersion amount can be compensated. That is, if the variable dispersion compensator (T-DC) positioned in the optical transmission line can be used to perform dispersion compensation at once for the optical path A (see FIG. 14), low-cost dispersion compensation can be realized.

Figure 17:
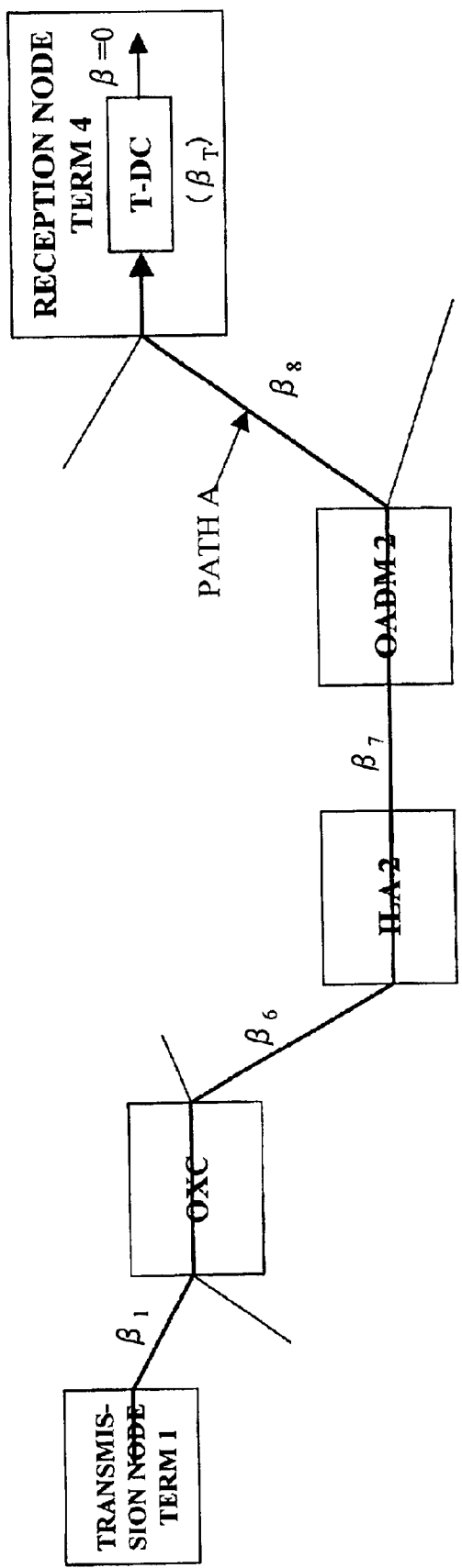
FIG. 17 is a block diagram showing an example (1) of compensation of a wavelength dispersion amount according to the present invention.

FIG. 17 shows a compensation example (1) of such a wavelength dispersion amount. This example shows an arrangement in which the variable dispersion compensator T-DC is positioned at the reception node TERM4. In this case, control is exercised such that the wavelength dispersion amounts $\Sigma\beta_i=\beta_1+\beta_6+\beta_7+\beta_8$ accumulated for each channel, up to the preceding stage, can be most satisfactorily compensated.

That is, adjustments are performed such that $\Sigma\beta_i$+the wavelength dispersion amount $\beta_T$ of the variable dispersion compensator T-DC="0".

This variable dispersion compensator T-DC is well-known in the art, as disclosed in U.S. Pat. Nos. 5,930,045 and 969,866.

A plurality of such variable dispersion compensators T-DC are positioned on the network. By adjusting their setting values mutually, adjustments may be performed so as to obtain an optimal dispersion compensation amounts. Also, if the variable dispersion compensators T-DC can adjust the wavelength characteristics, the setting values may be varied for each wavelength according to the dispersion amounts for each wavelength.

Figure 18:
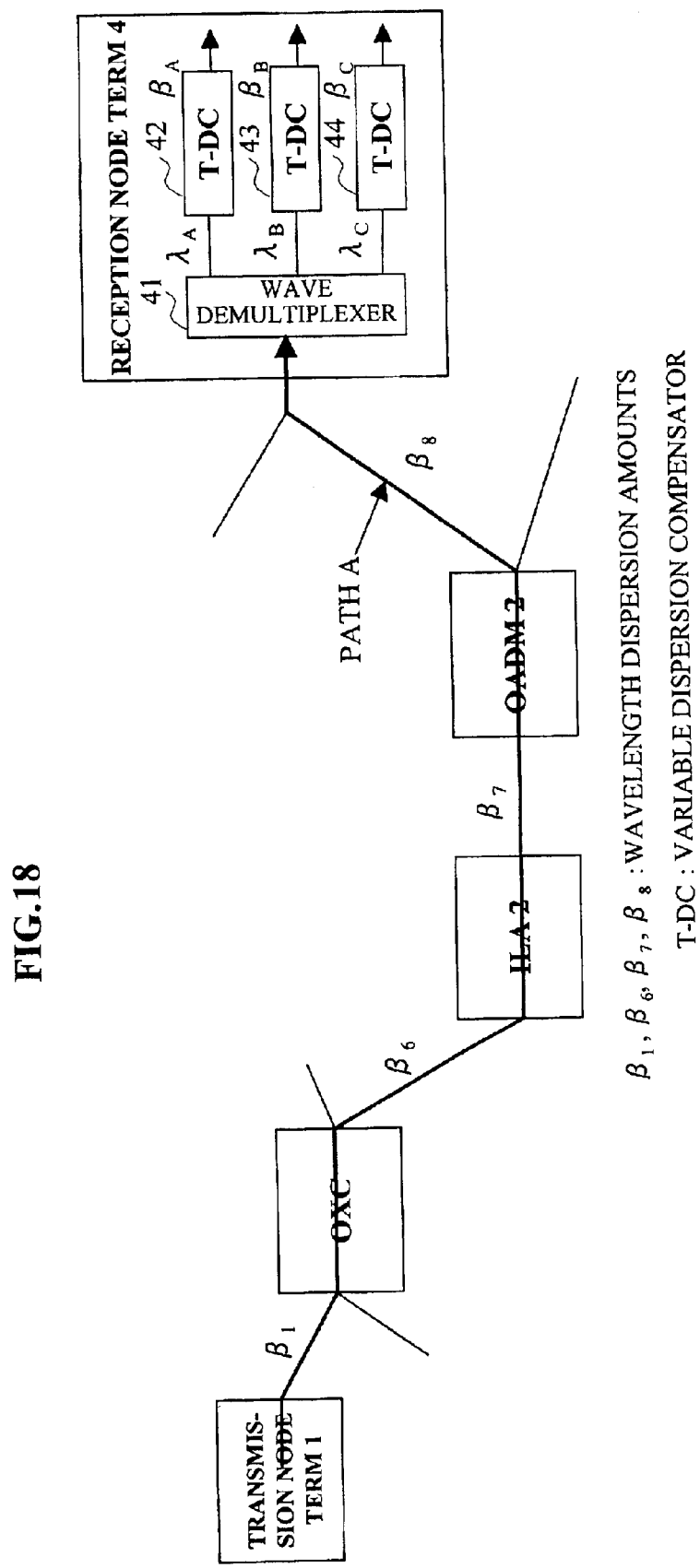
FIG. 18 is a block diagram showing an example (2) of compensation of a wavelength dispersion amount according to the present invention.

Such an example is shown as compensation example (2) in FIG. 18. That is, in the compensation example (1), the dispersion compensation is performed at once for the WDM optical signals; since different dispersions are compensated at each wavelength, a wave demultiplexer 41 which demultiplexes the input optical signals, and variable dispersion compensators 42–44 for each of the demultiplexed wavelengths $\lambda_A$–$\lambda_c$ from the wave demultiplexer 41 can be used at the reception node TERM4 to set the dispersion compensation amount.

Also, the method of dividing into a plurality of wavelengths may be one which divides into channels with nearby wavelengths, or one which divides into channels tracing the same path.

Figure 19:
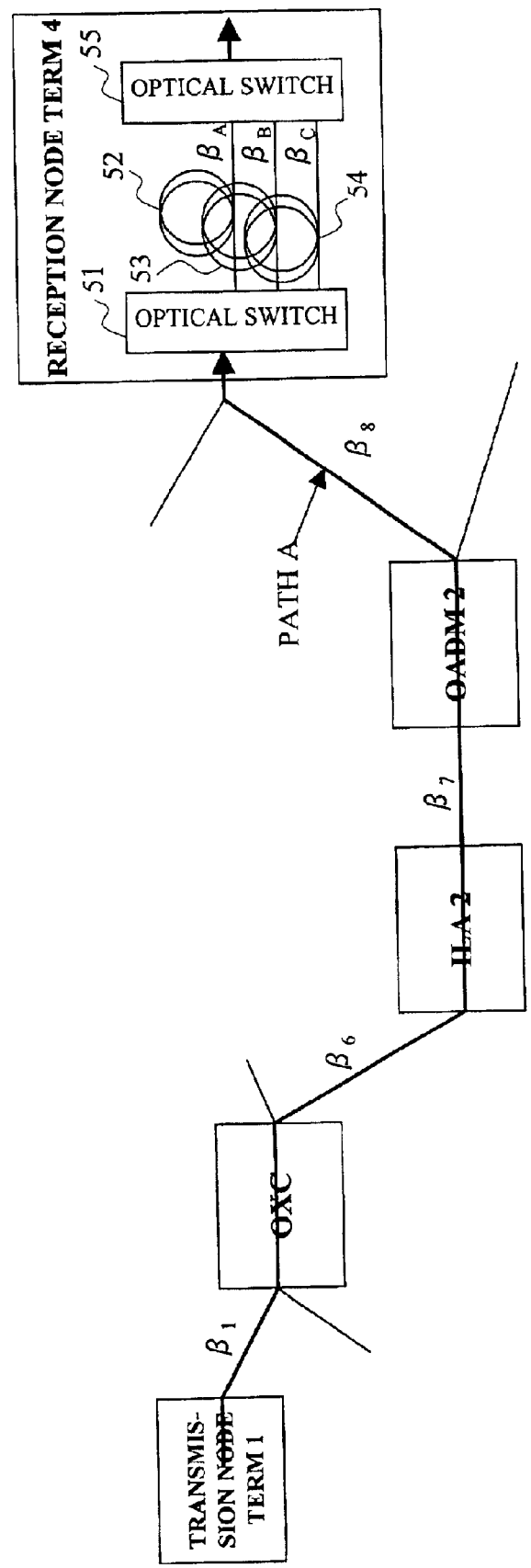
FIG. 19 is a block diagram showing an example (3) of compensation of a wavelength dispersion amount according to the present invention.

As another compensating example (3) of the wavelength dispersion amount, as shown in FIG. 19, in place of the variable dispersion compensators T-DC, by using three dispersion compensating fibers 52–54 at the reception node TERM4 as shown in FIG. 19, the dispersion compensation amount may be switched over by performing switching according to the dispersion compensation amount necessary at optical switches 51 and 55.

It is to be noted that in this example, the dispersion compensation fibers 52–54 are positioned in parallel; however, these dispersion compensation fibers 52–54 may be connected in series, and the connection end may be switched over using an optical switch. In this case, it is possible to perform more precise control of the wavelength dispersion amount. Also, this may be combined with a variable dispersion compensator T-DC like that described above.

Figure 20:
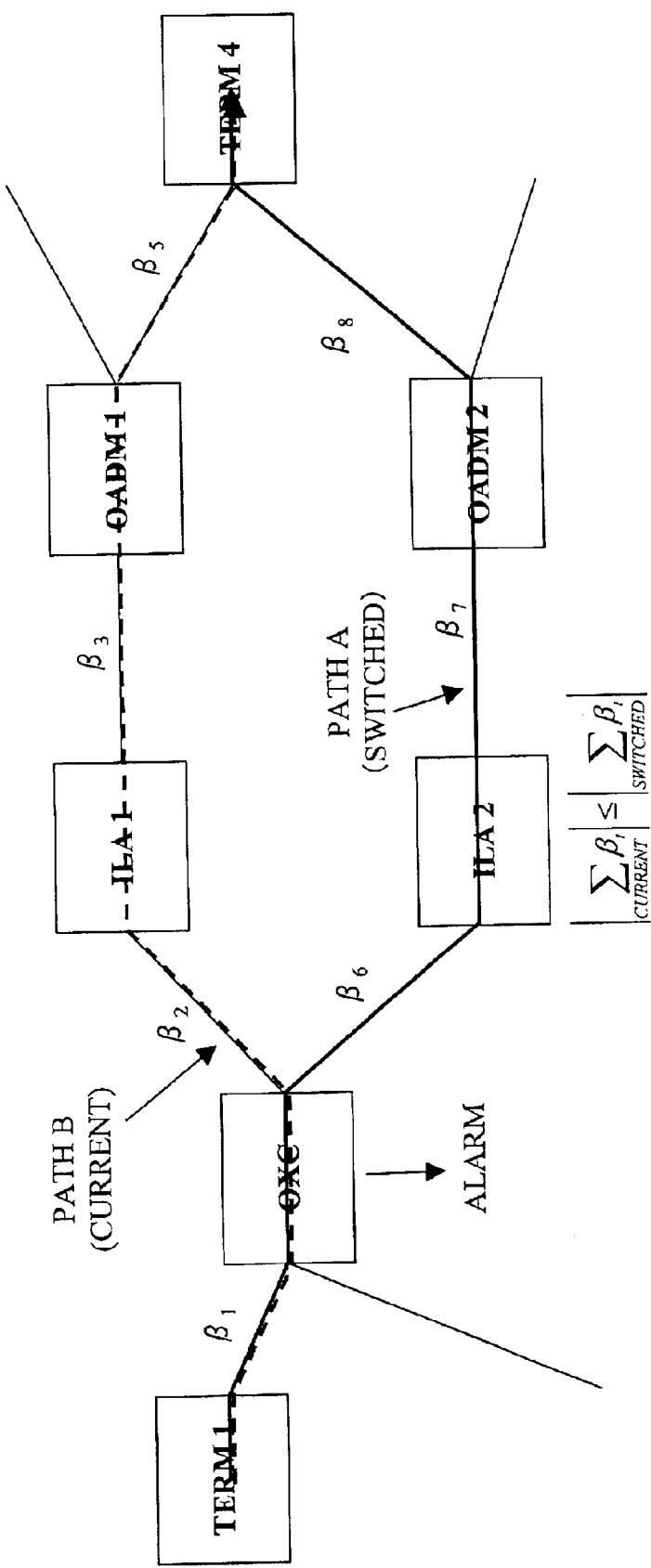
FIG. 20 is a block diagram showing an example (4) of compensation of a wavelength dispersion amount according to the present invention.

Also, FIG. 20 shows a compensation example (4) of the wavelength dispersion amount; in this case, the total of the wavelength dispersion amounts for the switched path B, which is calculated in advance for the current path A, and if the wavelength dispersion amount is greater than that for the path A, or if it is greater than a preset threshold value which suppresses characteristic deterioration, it is judged that the main signal transmission characteristic may be deteriorated, and an alarm is generated at the optical cross-connect node OXC performing the switching.

It is to be noted that such an alarm can be an alarm for all the wavelengths for which the path is the same, or can be an alarm generated for wavelength units, including the wavelength dependency of the dispersion amount.

It is to be noted that if there is no state in which an alarm is generated, that is, if the cumulative wavelength dispersion amount after switching is smaller than the current cumulative wavelength dispersion amount, of course the optical cross-connect node OXC is switched over from the path A to the path B.

Also, a path with the dispersion amount smaller than the preset threshold value which suppresses the characteristic deterioration, may be selected for a switching destination. Furthermore, in cases where it is best to leave some amount of dispersion, the switching destination path, among all the paths, having the wavelength dispersion amount closest to that of the current path, may be selected.

Figure 21:
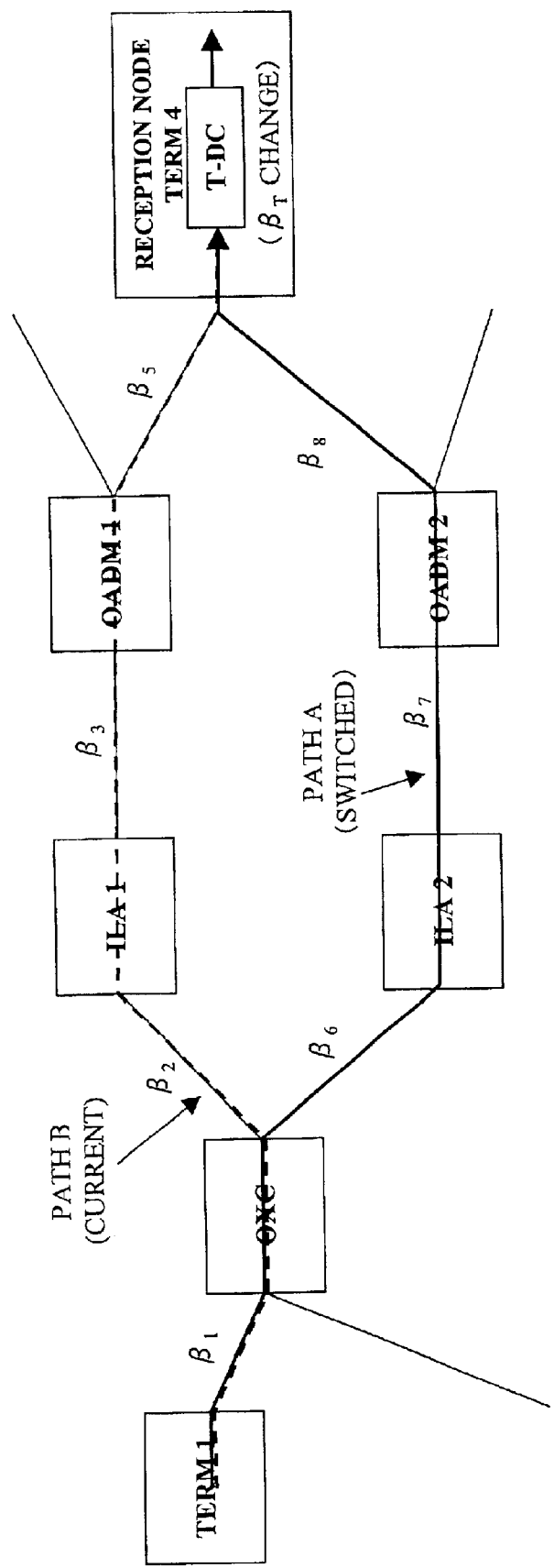
FIG. 21 is a block diagram showing an example (5) of compensation of a wavelength dispersion amount according to the present invention.

When performing such path switching, as in the compensation example (5) shown in FIG. 21, a configuration may be adopted in which the cumulative dispersion amount at the switching destination is calculated at the time of path switching, and by setting again the dispersion compensation amount of the variable dispersion compensator T-DC provided on the path such that the dispersion amount is reduced, deterioration of the transmission characteristic after switching can be prevented.

Further, by positioning a plurality of the variable dispersion compensators T-DC on the network, and by adjusting the dispersion amounts at places or in distributions for which the wavelength dispersion amount of the current lines not involved with the switching does not change, the deterioration of the characteristic of the current path can be prevented.

Figure 22:
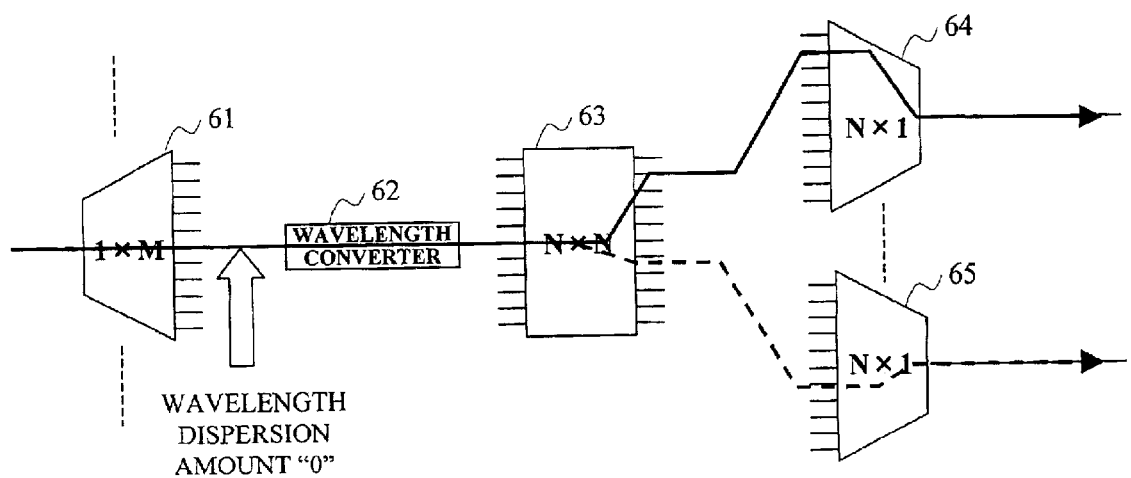
FIG. 22 is a block diagram showing an embodiment of a node using a wavelength conversion according to the present invention.

FIG. 22 shows an embodiment of a node using the wavelength conversion. In this example, a 1×M wave multiplexer 61, an N×N optical switch 63, and an N×1 wave multiplexer are used. By inserting a wavelength converter 62 between the wave multiplexer 61 and the optical switch 63, the optical cross-connect node performs the wavelength conversion.

In this configuration, paths are switched over by changing the signal wavelength. Normally settings are chosen such that the cumulative wavelength dispersion at the reception node is minimum; but in the case of an optical cross-connect node using such wavelength conversion, if the waveform at the wavelength conversion point is distorted due to dispersion, a useful characteristic is not obtained for the waveform after the conversion, and compensation on subsequent transmission lines is no longer possible.

Figure 23:
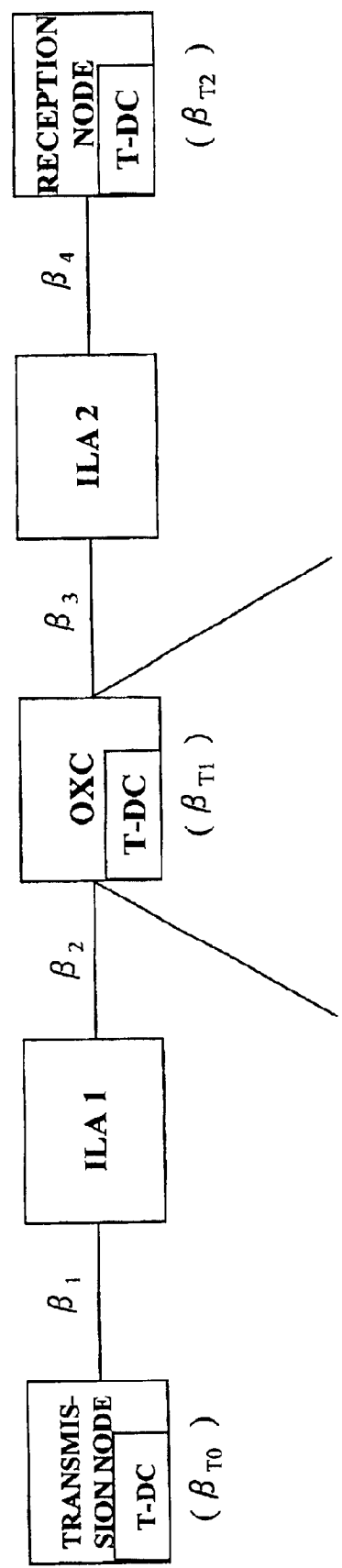
FIG. 23 is a block diagram showing an example (6) of compensation of a wavelength dispersion amount according to the present invention.
Figure 24A:
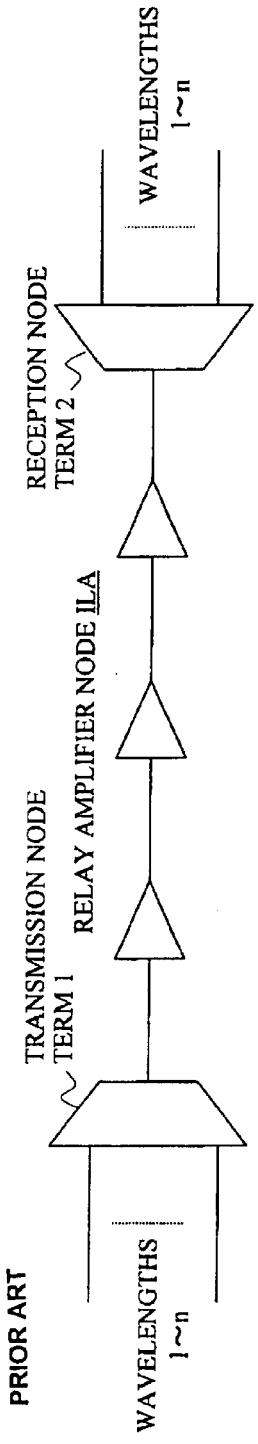
FIGS. 24A, 24B, 24C are block diagrams showing an example of a prior art optical transmission system.
Figure 24B:
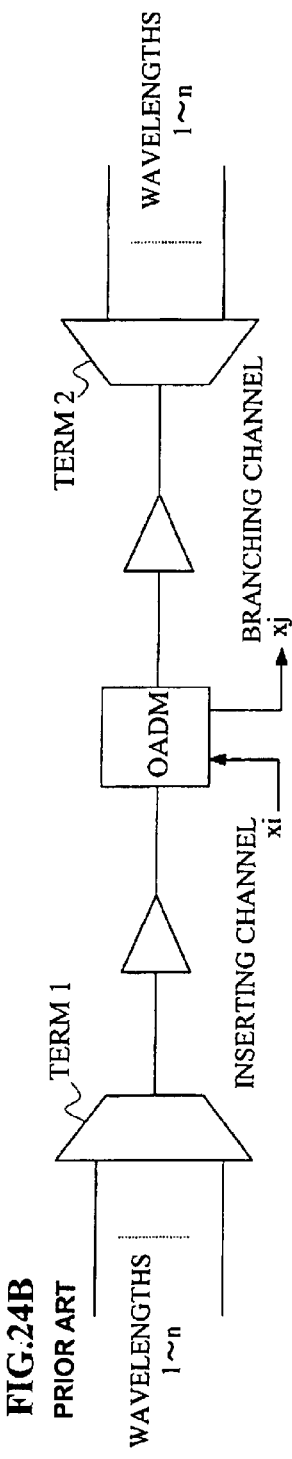
Figure 24C:
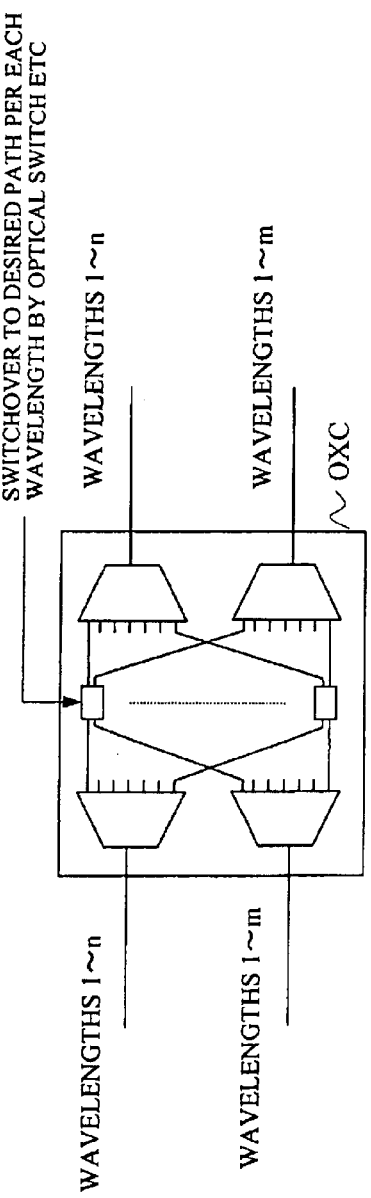
Figure 25A:
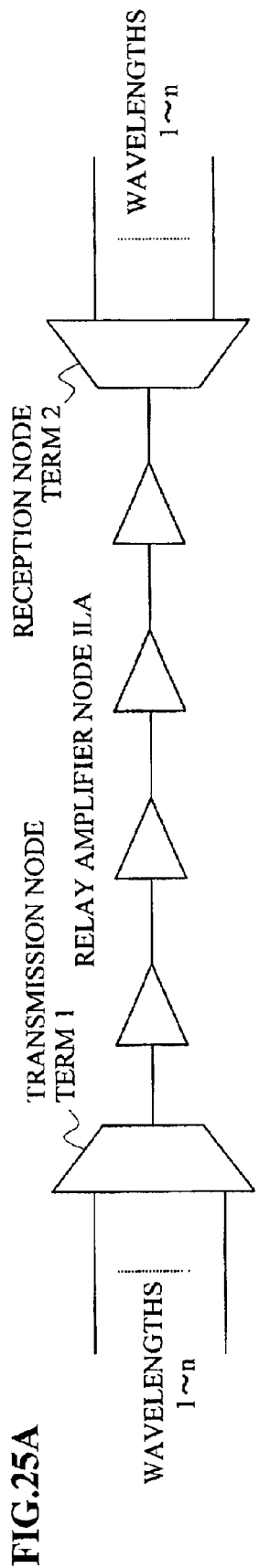
FIGS. 25A and 25B are diagrams used to explain accumulation of a wavelength dispersion amount.
Figure 25B:
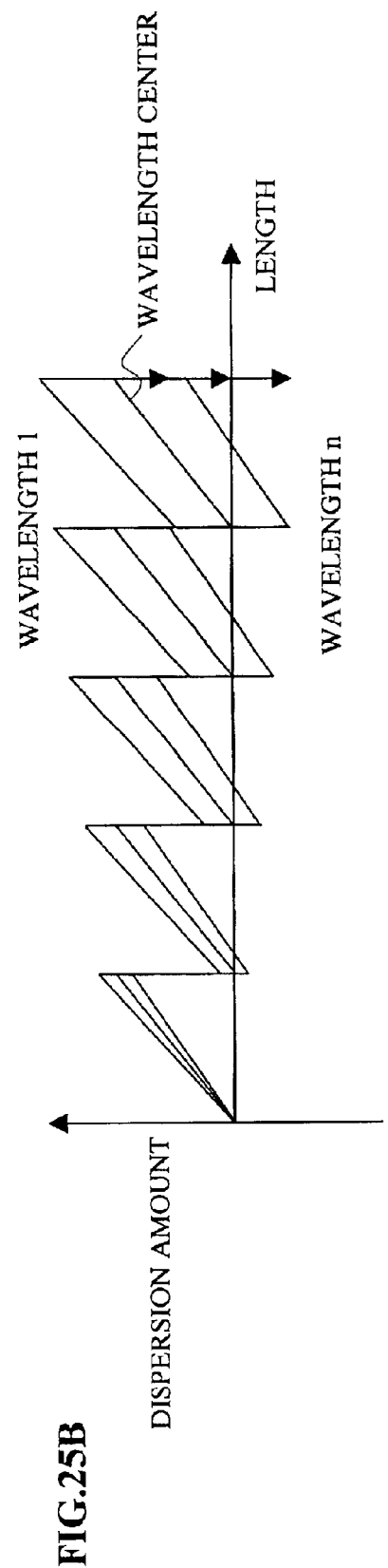

Therefore, as shown in the compensation example (6) of the wavelength dispersion amount in FIG. 23, by positioning the variable dispersion compensator T-DC at the wavelength-conversion optical cross-connect node OXC so as to minimize the cumulative wavelength dispersion amount at the wavelength conversion point not only at the reception node and by compensating the wavelength dispersion amount, the wavelength-conversion optical cross-connect nodes can be accommodated.

In this case, as a wavelength converter, a transponder may be used in which the optical/electrical conversion is performed once, and the electrical/optical conversion is again performed for transmission by using lasers with different wavelengths; alternatively, a wavelength converter with a nonlinear effect, or the line may be used to perform a wavelength conversion directly on the optical signal, without converting the optical signal into an electrical signal.

As described above, a method of measuring a wavelength dispersion amount and an optical transmission system according to the present invention is arranged such that a measuring signal is transmitted together with a main signal from a first node while a line is in operation, the measuring signal is extracted and returned at an opposing node a delay time required for the measuring signal to return is measured, a length of an optical transmission line between the nodes is calculated, and the wavelength dispersion amount of the optical transmission line is calculated based on the length at the first node. Therefore, it becomes possible to measure the wavelength dispersion amount of the transmission line in real time while a line is in operation.

Also, by superimposing on a main signal a plurality of signals of a wavelength bandwidth not used as a main signal or a pulse signal at a frequency which does not substantially influence the main signal, by transmitting the signal from a first node while a line is in operation, by extracting the measuring signals at an opposing node, by measuring delay times from arrival time differences of the signals, and by calculating the wavelength dispersion amount from wavelength dependency of the delay times, it becomes possible to measure the optical transmission line between the nodes while the line is in operation.

Furthermore, the method of measuring the wavelength dispersion amount and the optical transmission system according to the present invention is arranged such that in presence of a plurality of opposing nodes, the first node selects and switches over to an optimal optical transmission line based on the wavelength dispersion amounts calculated or collected for the optical transmission lines. Therefore, it becomes possible to always realize a high-quality optical transmission line.

What we claim is:

1. A method of determining a wavelength dispersion amount, comprising:

transmitting a measuring signal together with a main signal from a first node along an optical transmission line, while the optical transmission line is in operation;

extracting and returning the measuring signal at an opposing node; and measuring a delay time required for the measuring signal to return at the first node, calculating a length of the optical transmission line between the first and opposing nodes based on the measured delay, and calculating the wavelength dispersion amount of the optical transmission line based on the calculated length of the optical transmission line.

2. The method of determining the wavelength dispersion amount as claimed in claim 1 wherein the measuring signal comprises a monitoring control signal which is wavelength-division-multiplexed into the main signal.

3. The method of determining the wavelength dispersion amount as claimed in claim 1, wherein the measuring signal comprises a variable-wavelength light source signal which is wavelength-division-multiplexed into the main signal; the transmitting further comprises transmitting the wavelength-division-multiplexed variable wavelength light source signal and main signal, and the measuring and calculating further comprises calculating the wavelength dispersion amount from wavelength dependency of a plurality of delay times obtained by repeated performing said measuring the delay time.

4. The method of determining the wavelength dispersion amount as claimed in claim 1, wherein the returning further comprises returning the measuring signal either as an optical signal unchanged, or through an optical/electrical conversion.

5. The method of determining the wavelength dispersion amount as claimed in claim 1, wherein the transmitting further comprises transmitting the measuring signal over an up line or a down line of the first node, and the returning further comprises returning the measuring signal over said up line or down line while avoiding crosstalk, so that the measuring signal is thereby transmitted and returned over a same line.

6. The method of determining the wavelength dispersion amount as claimed in claim 5, wherein the measuring signal comprises signals of different frequencies.

7. An optical transmission system comprising a plurality of nodes including:
- a first node transmitting a measuring signal together with a main signal along an optical transmission line, while the optical trasnmission line is in operation;
- an opposing node extracting and returning the measuring signal; and
- the first node measuring a delay time required for the measuring signal to return, calculating a length of an optical transmission line between the first and the opposing nodes based on the measured delay, and calculating the wavelength dispersion amount of the optical transmission line based on calculated length of the optical transmission line.

8. The optical transmission system as claimed in claim 7, wherein the measuring signal comprises a monitoring control signal which is wavelength-division-multiplexed into the main signal.

9. The optical transmission system as claimed in claim 7, wherein:
- the measuring signal comprises a variable-wavelength light source signal which is wavelength-division-multiplexed into the main signal; and
- the first node transmits the wavelength-division-multiplexed measuring signal and main signal and calculates the wavelength dispersion amount from wavelength dependency of a plurality of delay times obtained by repeated delay time measuring at the first node.

10. The optical transmission system as claimed in claim 7, wherein the opposing node returns the measuring signal either as an optical signal unchanged, or through an optical/electrical conversion.

11. The optical transmission system as claimed in claim 7, wherein the first node has crosstalk avoiding means and transmits the measuring signal over an up line or a down line of the first node, and the opposing node returns the measuring signal over said up line or down line using the crosstalk avoiding means, so that the measuring signal is thereby transmitted and returned over a same line.

12. The optical transmission system as claimed in claim 7, further comprising a plurality of opposing nodes, the first node selecting and switching over to an optimal optical transmission line based on wavelength dispersion amounts calculated for optical transmission lines.

13. The optical transmission system as claimed in claim 12, wherein the calculated wavelength dispersion amounts are exchanged among the opposing nodes, and the first node collects and accumulates the calculated wavelength dispersion amounts.

14. The optical transmission system as claimed in claim 13, further comprising a variable dispersion compensator on a desired optical transmission line, compensating for a wavelength dispersion amount of the desired optical transmission line.

15. The optical transmission system as claimed in claim 14, wherein the variable dispersion compensator is provided for each wavelength, or for groups of wavelengths, in the main signal.

16. The optical transmission system as claimed in claim 14, wherein the first node again sets the wavelength dispersion amount of the variable dispersion compensator in conformity with the wavelength dispersion amount of the optical transmission line to be switched over upon a switchover of the optical transmission line.

17. The optical transmission system as claimed in claim 14, wherein the wavelength dispersion amount is compensated at a node in which a wavelength conversion is performed.

18. The optical transmission system as claimed in claim 13, further comprising dispersion compensation fibers with different wavelength dispersion amounts, and an optical switch which switches over the fibers according to a required wavelength dispersion amount.

19. The optical transmission system as claimed in claim 12, wherein the first node generates an alarm when the wavelength dispersion amount of the optical transmission line to be switched over becomes greater than the wavelength dispersion amount of a working optical transmission line upon a switchover of the optical transmission line.

20. The optical transmission system as claimed in claim 7, wherein the measuring signal is wavelength-division-multiplexed into the main signal according to a number of optical transmission lines.

21. A node, comprising:
- first means for transmitting a measuring signal together with a main signal along an optical transmission line, while the optical transmission line is in operation;
- second means for extracting and returning the received measuring signal; and
- third means for calculating a length of a section of the optical transmission line from a delay time required for the measuring signal to return, and a wavelength dispersion amount of the section of the optical transmission line based on the calculated length of the section of the optical transmission line.

22. The node as claimed in claim 21, wherein the measuring signal comprises a monitoring control signal which is wavelength-division-multiplexed into the main signal.

23. The node as claimed in claim 21, wherein the measuring signal comprises a variable-wavelength light source signal which is wavelength-division-multiplexed into the main signal; the first means transmitting the wavelength-division-multiplexed measuring signal and main signal, and the third means calculating the wavelength dispersion amount from wavelength dependency of a plurality of delay times obtained by repeated measuring by the third means.

24. The node as claimed in claim 21, wherein the second means returns the measuring signal either as an optical signal unchanged, or through an optical/electrical conversion.

25. The node as claimed in claim 21, wherein the first means transmits the measuring signal over an up line or a down line, and the second means returns the measuring signal over said up line or down line using crosstalk avoiding means, so that the measuring signal is transmitted and returned over a same line.

26. The node as claimed in claim 25, wherein the measuring signal comprises signals of different frequencies used for said same line.

27. A method comprising:
- means for transmitting a measuring signal together with a main signal from a first node along an optical transmission line, while the optical transmission line is in operation;
- means for extraction and returning the measuring signal at an opposing node; and
- means for measuring a delay time required for the measuring signal to return at the first node, for calculating a length of the optical transmission line between the first and opposing nodes based on the measured delay, and for calculating the wavelength dispersion amount of the optical transmission line based on the calculated length of the optical transmission line.

* * * * *

UNITED STATES PATENT AND TRADEMARK OFFICE
CERTIFICATE OF CORRECTION

PATENT NO. : 6,864,968 B2
DATED : March 8, 2005
INVENTOR(S) : Shota Mori et al.

It is certified that error appears in the above-identified patent and that said Letters Patent is hereby corrected as shown below:

Title page,
Item [57], ABSTRACT,
Line 1, insert -- the -- after "of".

Column 19,
Line 25, delete "an" and insert -- the --.

Signed and Sealed this

Twenty-third Day of August, 2005

JON W. DUDAS
*Director of the United States Patent and Trademark Office*